United States Patent [19]

Kostopoulos

[11] Patent Number: 4,670,841

[45] Date of Patent: Jun. 2, 1987

[54] COMPOSITE CHARACTER GENERATOR

[76] Inventor: George K. Kostopoulos, 22095 Boca Place Dr., Boca Raton, Fla. 33433

[21] Appl. No.: 757,873

[22] Filed: Jul. 23, 1985

[51] Int. Cl.⁴ .................... G06F 12/08; G06F 15/62; G06F 3/14

[52] U.S. Cl. ................................. 364/419; 364/900; 364/518; 400/110; 340/731; 340/751

[58] Field of Search ... 364/419, 518, 521, 200 MS File, 364/900 MS File; 340/731, 751; 400/110, 121

[56] References Cited

U.S. PATENT DOCUMENTS

| | | | |
|---|---|---|---|
| 4,228,507 | 10/1980 | Leban | 364/419 |
| 4,298,957 | 11/1981 | Duvall et al. | 364/900 |
| 4,408,199 | 10/1983 | White et al. | 340/731 |
| 4,435,703 | 3/1984 | Hunt et al. | 340/731 X |
| 4,490,789 | 12/1984 | Leban et al. | 364/419 |
| 4,511,267 | 4/1985 | Pokorny et al. | 400/110 |
| 4,531,120 | 7/1985 | Brownell, Jr. et al. | 340/731 X |
| 4,555,191 | 11/1985 | Gojo | 400/110 X |
| 4,573,199 | 2/1986 | Chen et al. | 340/731 X |
| 4,621,340 | 11/1986 | Pokorny et al. | 364/900 |

Primary Examiner—Gary V. Harkcom
Attorney, Agent, or Firm—Antonelli, Terry & Wands

[57] ABSTRACT

A system for the generation of composite ideographic characters is disclosed. Composite characters are generated by the placement of basic characters which are stored in memory into basic layouts which have at least two selection areas which divide the display area of a display device. The basic layouts are generated by the selection of one of a plurality of basic layouts stored in memory. The basic characters are placed in a selection area of a basic layout by selection of one of a plurality of basic characters stored in memory. Basic layouts may be nested within the active selection area of a current layout. Scaling of basic character size and location and basic layout size and location is accomplished by use of stored compression coefficients and the origin of each selection area of the basic layouts.

19 Claims, 23 Drawing Figures

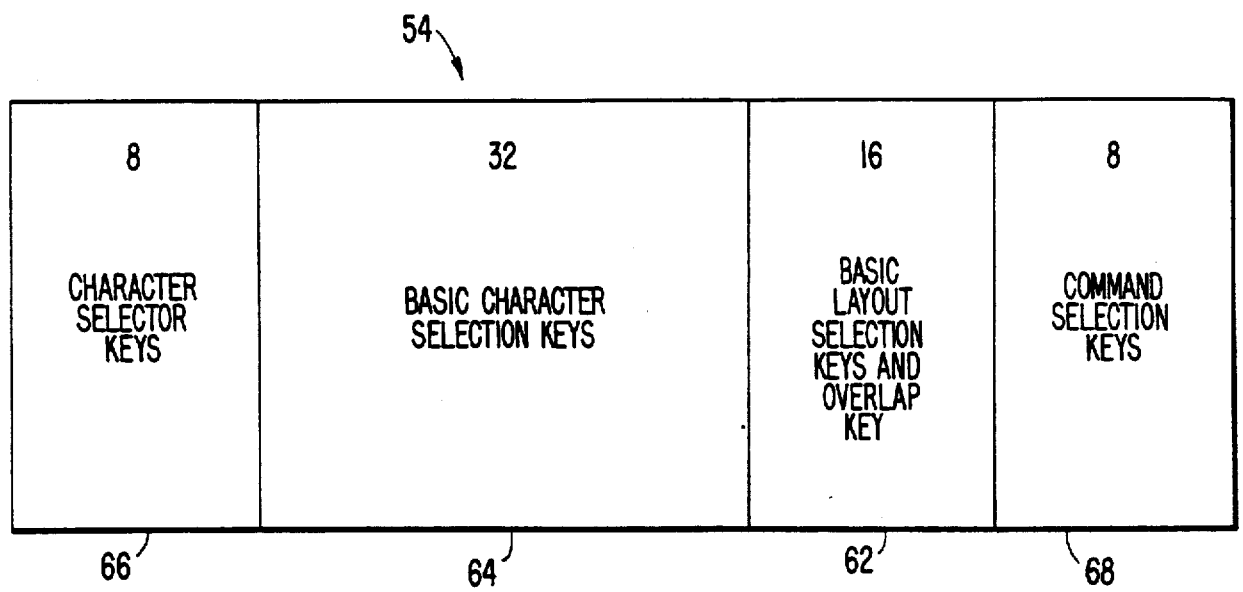
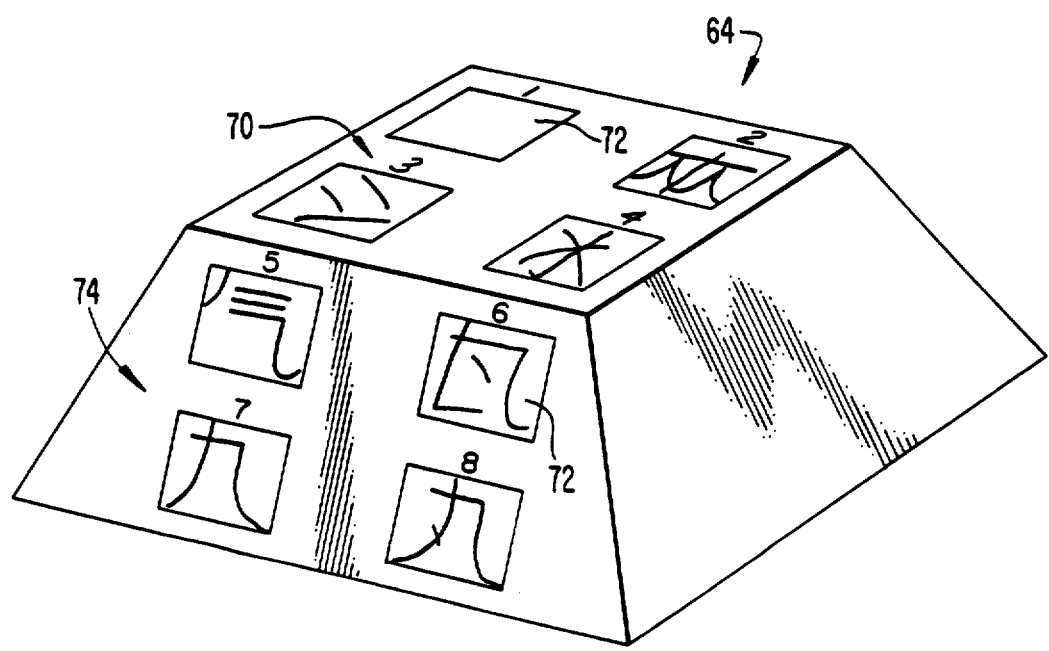

BASIC LAYOUTS (1) $XC = (XS - Xo)Xc$ (2) $YC = (YS - Yo)Yc$ (3) $XS = \frac{XC}{Xc} + Xo$ (4) $YS = \frac{YC}{Yc} + Yo$

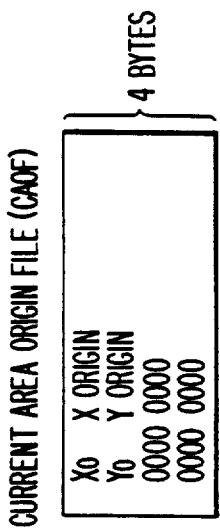
FIG. 9A.
CURRENT AREA ORIGIN FILE (CAOF)
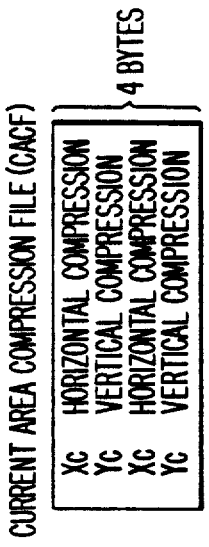
FIG. 9B.
CURRENT AREA COMPRESSION FILE (CACF)
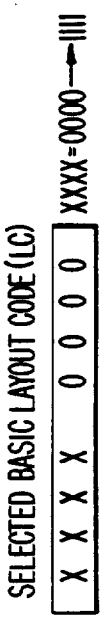
FIG. 9C.
SELECTED BASIC LAYOUT CODE (LC)
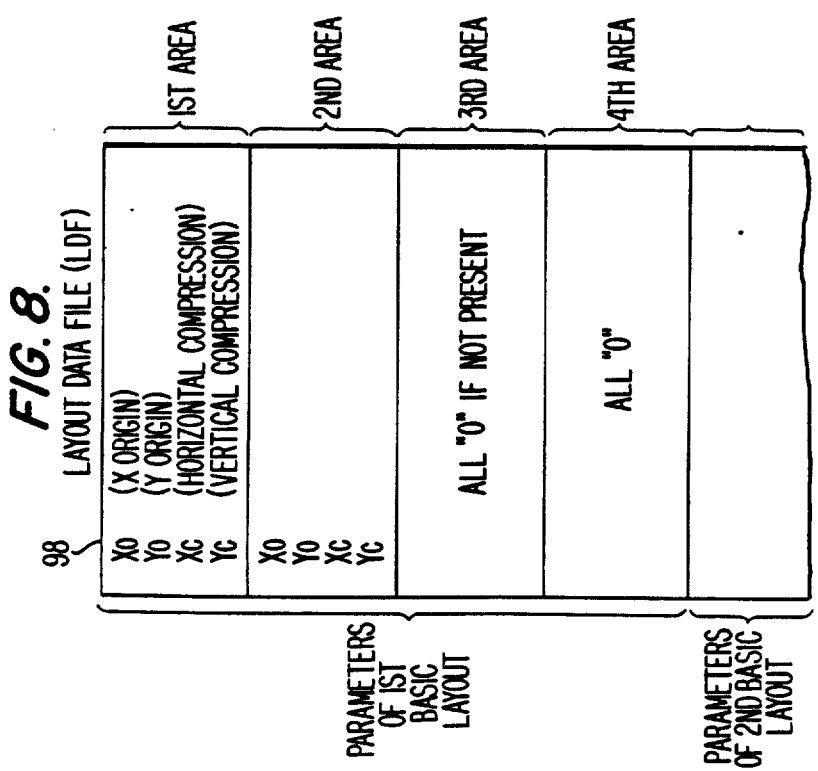
FIG. 8.
LAYOUT DATA FILE (LDF)
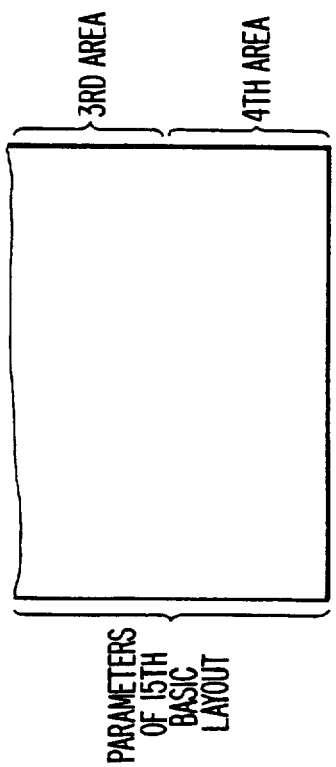

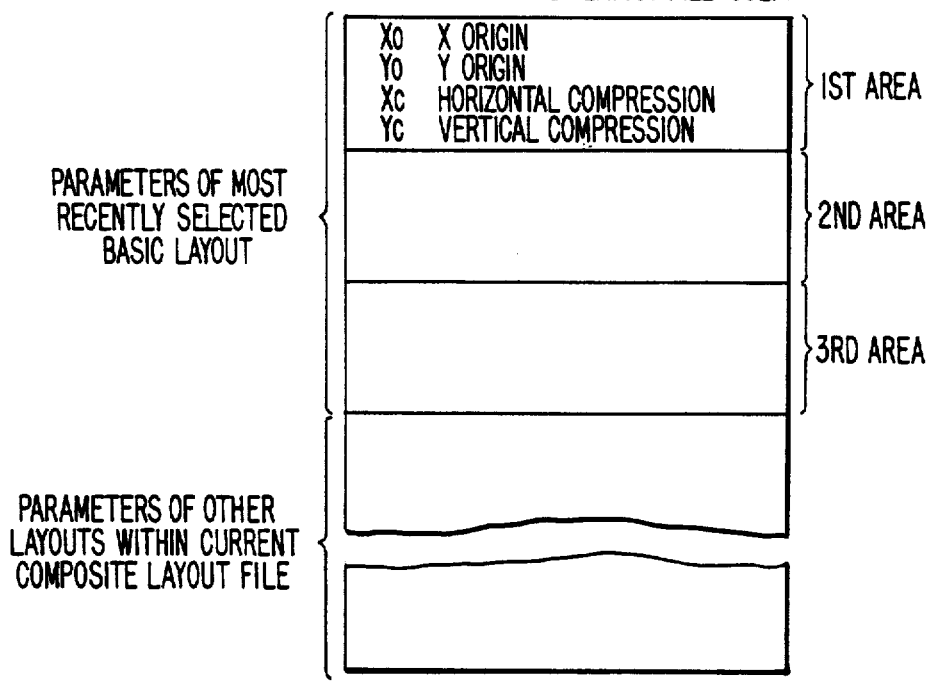
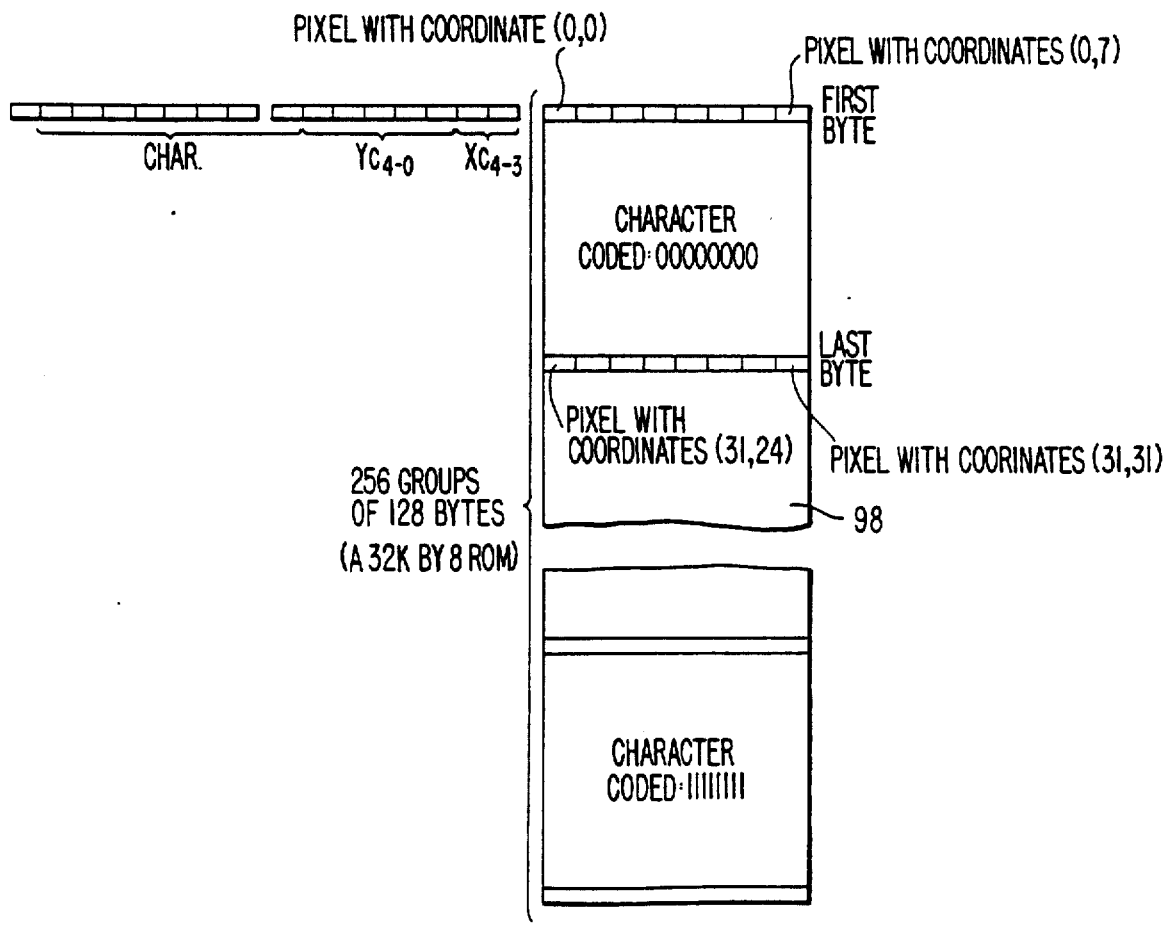

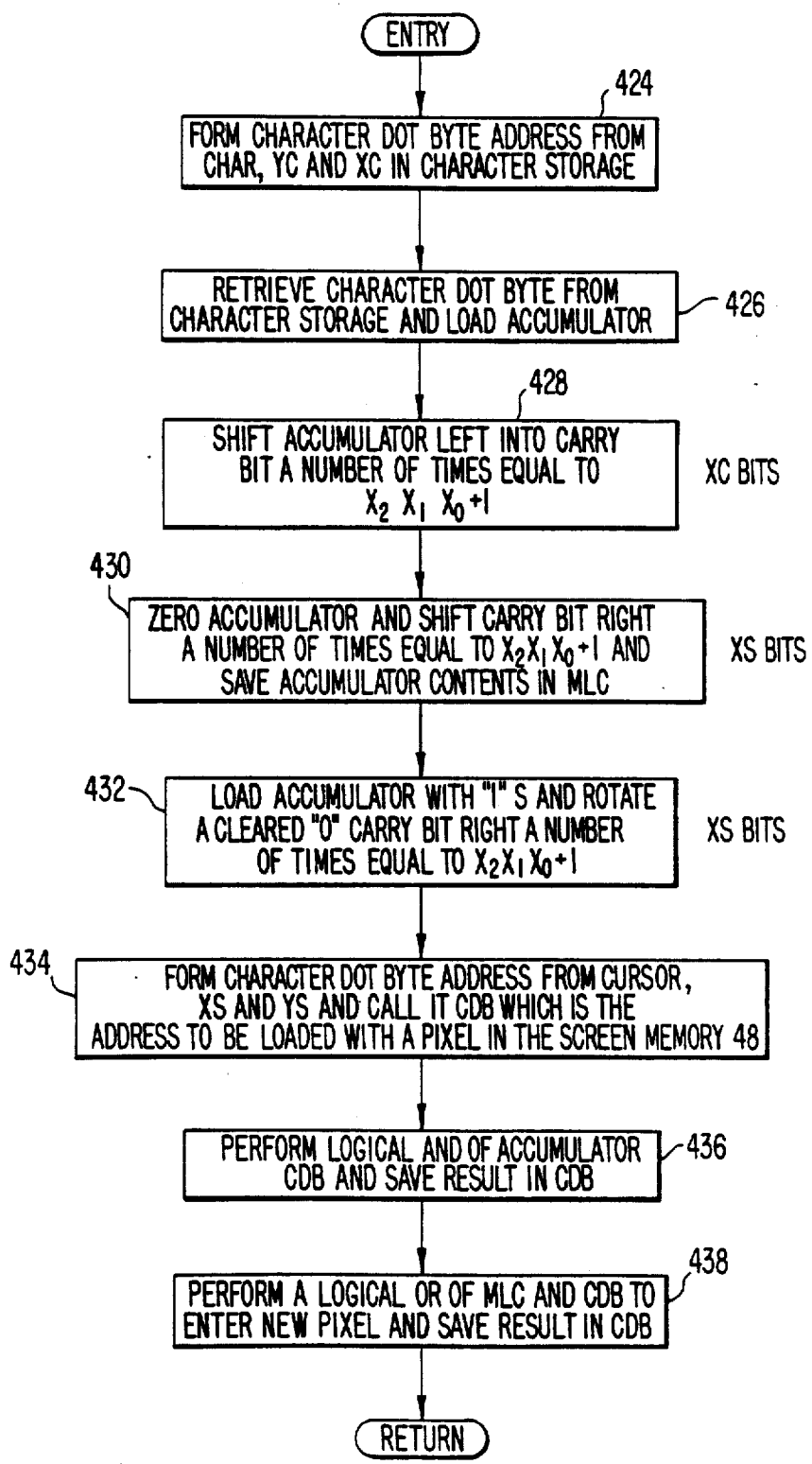

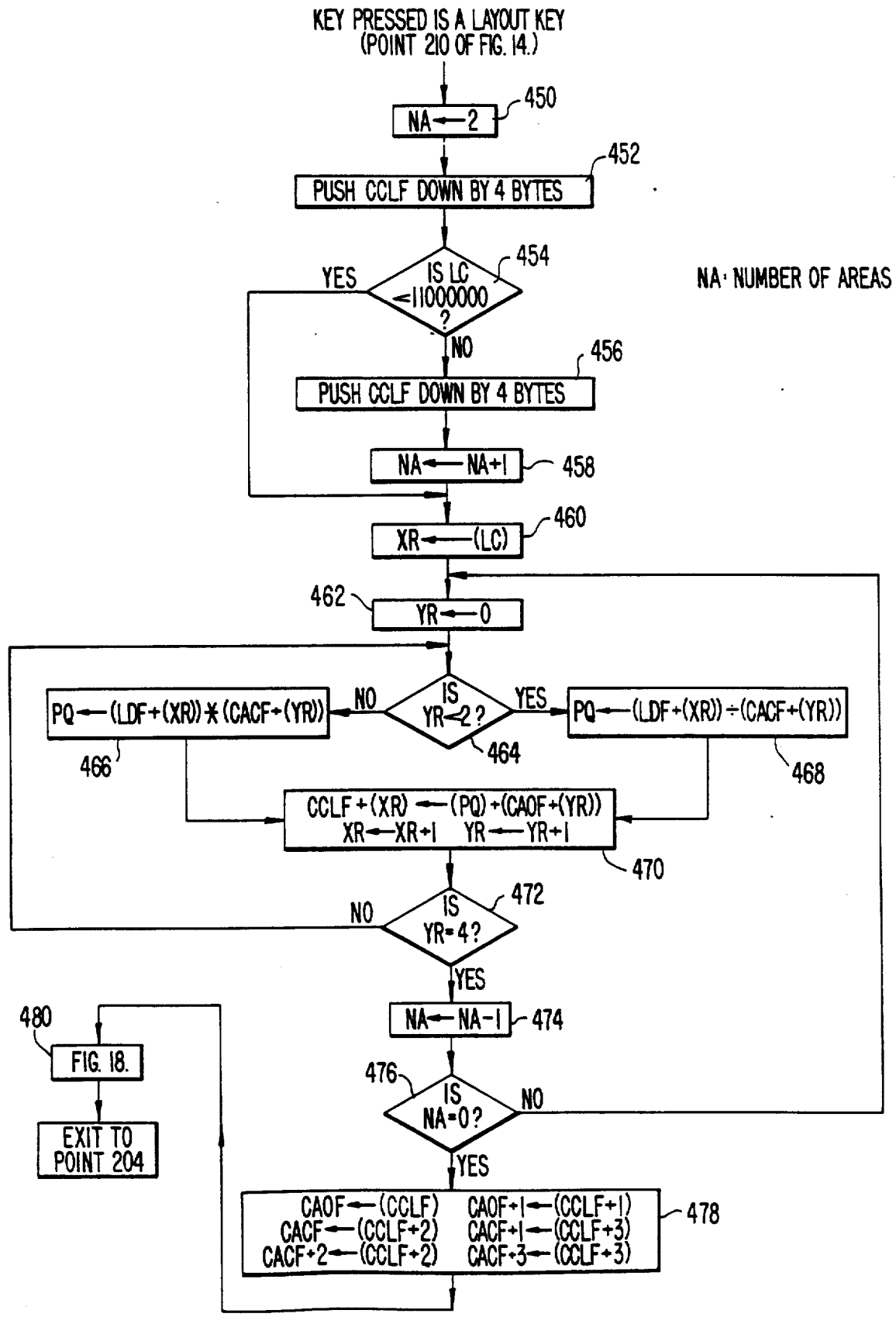

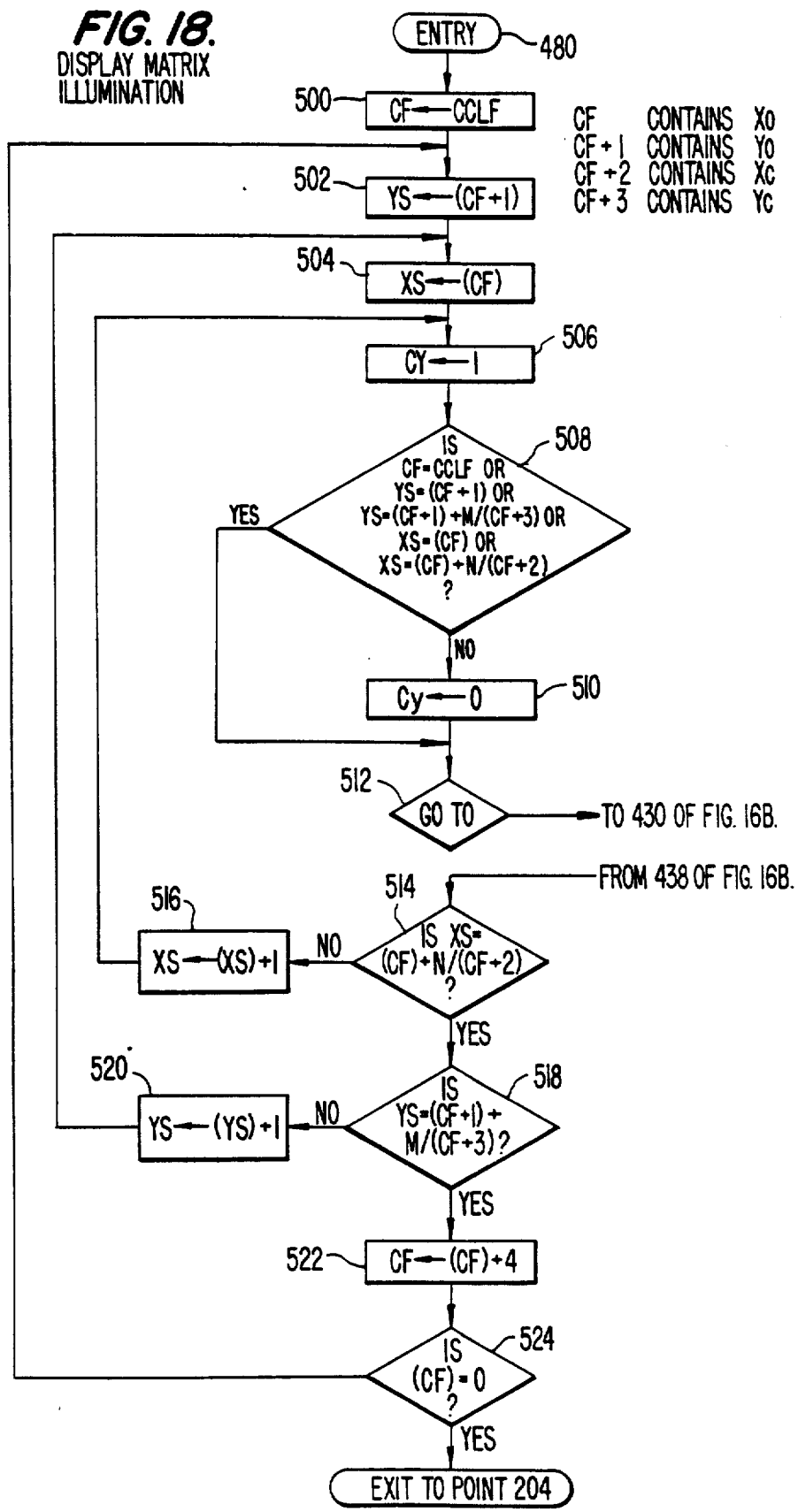

COMPOSITE CHARACTER GENERATOR

BACKGROUND OF THE INVENTION

1. Field of the Invention

The present invention relates to systems for generating composite characters from a combination of basic characters or strokes.

2. Description of the Prior Art

Writing in ideographic based languages, such as Chinese, Korean and Japanese, requires that the writer must have a working knowledge of several thousand ideographs. Ideographs express concepts analogous to words in Western languages. Thus, writing in ideographic languages is idea oriented as contrasted with the phonetic alphabetical systems of Western languages. The large number of ideographs necessary for a writing knowledge of Japanese, Korean and Chinese requires greater skill to typewrite text than with Western languages. Heretofore, attempts to produce a low cost, easy to use ideographic based typewriter have not been successful because of the requirement that thousands of ideographs must be readily selectable from the keyboard.

It is known that composite ideographic characters may be generated by the selective placement of radicals (basic characters) within areas of a layout which divides a display screen or a given section of the display screen of the display device on which the characters are generated into two or more areas. It is also known that one of the plurality of areas of a layout may be further subdivided by inclusion (nesting) of another layout having two or more areas within that area to subdivide the area into two or more additional parts within which basic characters may be placed. Prior art references pertaining to this technique are: (1) "An Interactive System for Chinese Character Generation and Retrieval" by Shi-kuo Chang, IEEE Transactions on Systems and Cybernetics, Vol. SMC-3, No. 3, May 1973; (2) National Bureau of Standards Technical Note 254, issued January 4, 1965 on "The Pictorial Structure of Chinese Characters" by B. Kirk Rankin, III, Walter A. Sillars and Robert W. Hsu; (3) National Bureau of Standards Technical Note 296, "A Grammar for Component Combination in Chinese characters", by B. Kirk Rankin, III, Stephanie Siegel and Ann McClelland of the Center for Computer Sciences and Technology, Institute for Applied Technology, National Bureau of Standards and James L. Tan, George Washington University; (4) National Bureau of Standards Technical Note 492, issued February 1970, "Component Combination and Frame Embedding in Chinese Character Grammar", by Kirk Rankin and James L. Tan; and (5) IBM Technical Disclosure Bulletin, Vol. 17, No. 7, December 1974, "Interactive Ideographic System", by I. M. Miller, M. N. Shen and R. C. Shen. None of the aforementioned publications discloses a complete implementation of a system for generating composite characters by the placement of basic characters within selected areas of basic layouts. Moreover, the aforementioned prior art references do not disclose the usage of compression coefficients or any other specific technique for the placement of basic characters within areas of basic layouts.

SUMMARY OF THE PRESENT INVENTION

The present invention is a character generator useful for the generation of ideographic characters in languages such as Chinese, which are also used in the Japanese and Korean languages or multilevel characters in Korean, Tai or some Indian languages, by the selection of basic characters which are displayed within selection areas of a basic layout which is chosen for display on a display device. The present invention generates composite characters from basic characters or strokes which are stored in a character memory which are selectively placed within an active area of multiple selection areas defined by basic layouts which are also selectively chosen for display on the display device. Basic layouts may be "nested" within the active area of a previously chosen basic layout to subdivide the active area of the display screen into further areas where selected basic characters are placed to generate the composite character.

The present invention may be made from inexpensive electronic components which are present in a standard graphics system. Furthermore, the invention has the advantage of being easy to use for persons having only a working writing knowledge of the particular language for which composite characters are to be generated without any special mechanical or linguistic skills. Unlike many prior art systems for generating composite Chinese, Korean and Japanese characters or multilevel characters, a special working knowledge of a particular system is not required. The only requirement is that the operator be able to recognize the appearance of a composite character to be generated and further be able to break up that composite character into constituent basic characters and one or more basic layouts.

A system for generating composite characters from a combination of basic characters for display on a display device having a display area in accordance with the invention which includes a storage for basic characters for permitting the selection of any one of the basic characters for display on the display area, each basic character being stored in a matrix of storage locations with each location storing a pixel of information which may be displayed on the display area when each basic character is displayed; a storage for a plurality of basic layouts which may be selected for display on the display area, each basic layout having at least two selection areas within the display area, each of the selection areas being selectable for the display therein of one the basic layouts or one of the basic characters, the storage for the basic layouts having storage locations for storing parameters which define each selection area of each basic layout, the parameters for each selection area being the coordinates of an origin and a pair of orthogonal compression coefficients, a basic layout selector for selecting for display any one of the basic layouts on the display area, each of the pixels of a selected basic layout being displayed when a basic layout has not been previously displayed and the pixels of a selected basic layout to be displayed within a selection area of a previously selected basic layout being a function of the orthogonal compression coefficients stored in association with the selection area of the previously selected basic layout; a basic character selector for selecting for display any one of the basic characters within one of the selection areas of the basic layout, the display of the stored pixels of the selected basic character to be displayed within a selection area of a basic layout being a function of the orthogonal compression coefficients stored in association with the selection area of the basic layout; a current character layout file storage coupled to the storage for basic layouts for storing the orthogonal compression coefficients and an origin of the selection areas of one or more basic layouts in the order in which the selection areas of selected basic layouts are to have displayed therein either a basic character or another basic layout with the exception of the compression coefficients and origin of the selection area which is currently available to have a basic character or another basic layout displayed therein; a current area compression file storage coupled to the current character layout file storage for storing the orthogonal compression coefficients of the currently available selection area, the orthogonal compression coefficients stored in the current area compression file storage being coupled to the basic character selector to permit processing by the basic character selector when a basic character is selected for display in the currently available selection area and being coupled to the basic layout selector to permit processing by the basic layout selector when a basic layout is selected for display in the currently available selection area, the selection of either a basic character or a basic layout for display in the currently available selection area causing another pair of orthogonal compression coefficients of another selection area stored in the current character layout file storage to be transferred to the current area compression file for storage therein, a current area origin file storage coupled to the current character layout file storage for storing the coordinates of the origin of the currently available selection area, the coordinates of the origin in the current area origin file being coupled to the basic character selector to permit processing by the basic character selector when a basic character is selected for display in the currently available selection area and being coupled to the basic layout selector when a basic layout is selected for display in the currently available selection area, the selection of either a basic character or a basic layout for display in the currently available selection area causing the coordinates of the origin of another selection area stored in the current character layout file to be transferred to the current area origin file storage for storage therein and the orthogonal compression coefficients of the another selection area to the current area compression file; and a display memory coupled to the basic character selector and the basic layout selector for storing the pixels of any selected basic layouts and selected basic characters which are to be displayed on the display area.

A system further in accordance with the invention for generating composite characters includes a display having a display area for displaying composite characters which are generated by placement of basic characters within selection areas of basic layouts; a generator of basic layouts which may be selected for display on the display area, each basic layout containing a plurality of the selection areas, the generator including a basic layout memory having storage locations for defining each selectable area of each basic layout with a pair of orthogonal compression coefficients and the coordinates of an origin which are processed when any basic character or any basic layout is selected for display in any selection area; a generator for a plurality of basic characters which are individually selected for display within the selection areas of basic layouts on the display area for generating a composite character, the generator of basic characters including a character memory having storage locations for defining each basic character, each basic character being compressed by the orthogonal compression coefficients stored in the basic layout memory in association with the selected area within which the basic character is to be displayed; the generator for generating a plurality of basic characters controlling which of the pixels of the stored basic characters is displayed on the display as a function of the stored orthogonal compression coefficients; and the generator for a plurality of basic layouts controlling the display of a selected basic layout on the display area as a function of the stored orthogonal compression coefficients and origin of the selection area of the selected basic layout.

The terminology "basic character", as used herein, defines the minimum informational unit which is used to generate a composite character which may be but is not limited to any ideographic character of an ideographic based language or a multilevel character. The invention is not limited to the generation of composite characters in any particular language. A basic character is comprised of either a combination of several strokes, which expresses an idea, or single strokes which are used to refine or change the meaning of the idea expressed by a combination of strokes.

The terminology "basic layout", as used herein, defines the subdivision of a portion of the display area of a display device into at least two areas within which either a basic character or a further basic layout is selectively placeable during the generation of a composite character.

BRIEF DESCRIPTION OF THE DRAWINGS

FIG. 3 illustrates a suitable layout of the keyboard of the system of FIG. 2.

FIG. 4 illustrates a single character selection key having eight basic characters located on separate locations of the front and top faces.

FIG. 8 is a memory map of the layout data file (LDF).

FIGS. 9A, 9B and 9C, respectively, are a memory map of the current area origin file (CAOF), current area compression file (CACF) and selected basic layout code (LC).

FIG. 10 is a memory map of the current character layout file (CCLF).

FIGS. 13A and 13B illustrate the memory map of the basic character generator memory and the character display matrix, respectively.

FIGS. 16A and 16B are a flowchart of the character processing and sizing routine of FIG. 14 including a cursor/char subroutine.

FIG. 17 is a flowchart of the processing of layouts by the layout nesting routine of FIG. 14.

FIG. 18 is a routine for illumination of the boundaries and selection areas of the basic layouts.

DESCRIPTION OF THE PREFERRED EMBODIMENTS

Figure 1:
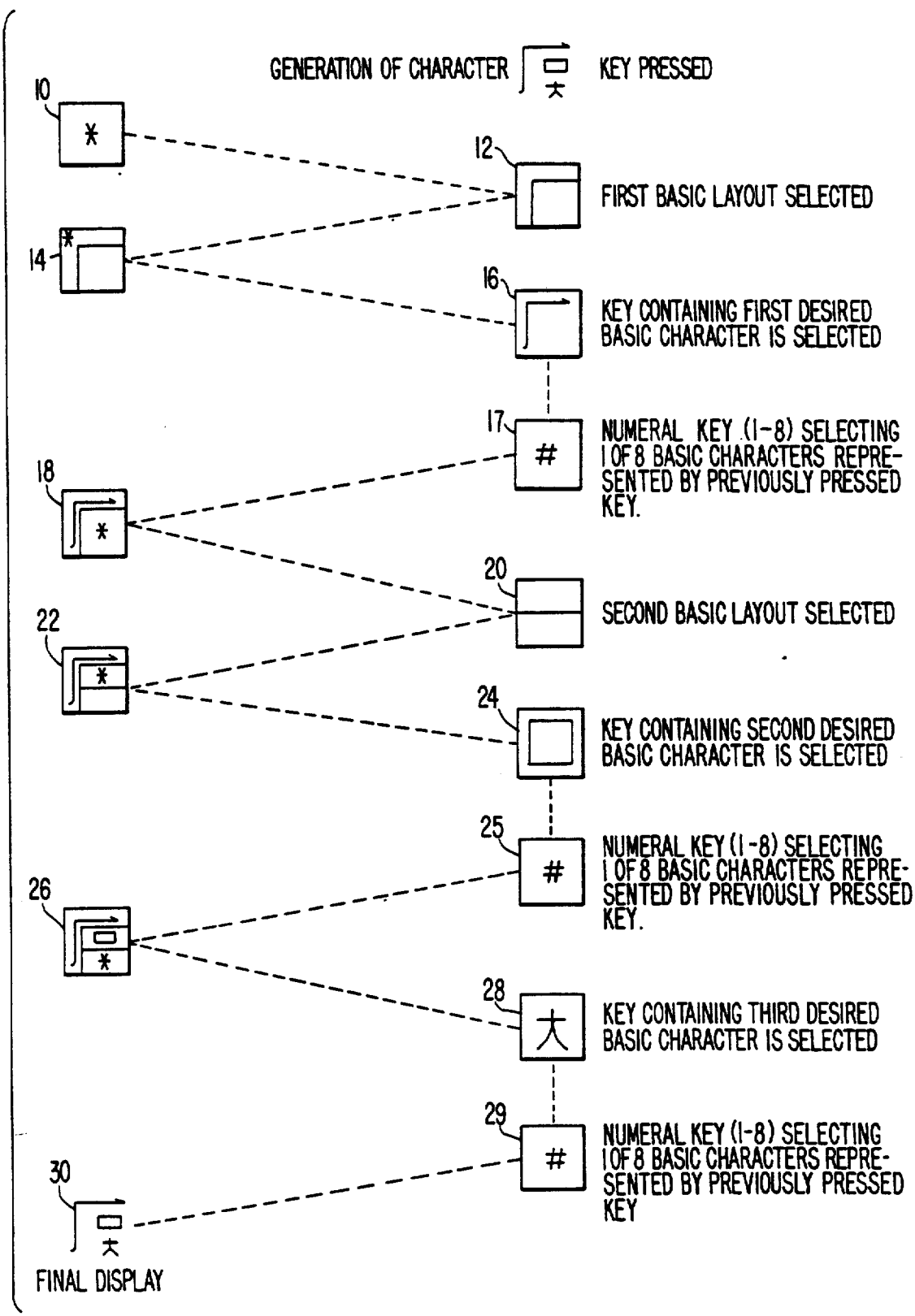
FIG. 1. illustrates the process of the generation of a composite character in accordance with the present invention.

FIG. 1 illustrates the sequence of steps for the generation of a typical composite ideographic character with the present invention. The steps can be implemented in hardware, software or in a combination of both. A software approach is described herein. The composite character is generated by the generation of a sequence of basic layouts in which the areas of the basic layouts are filled with selected basic characters. The selection and display of basic layouts and basic characters on the display screen of the display device is the result of information read from read only memory (ROM) contained in the system of FIG. 2. These basic layouts and characters are selected by the depressing of the appropriate keys of the keyboard of FIG. 3 as described, infra. An example is illustrated in FIG. 1 and is described below. The first step in the generation of a composite character is the choice by the operator of a first basic layout for display on the display area of the display device. The first step in the processing causes the display on the display area as identified by reference numeral 10 to proceed to point 12 wherein a first basic layout is selected. The first basic layout is selected from the basic layouts of FIG. 6 by the depressing of the appropriate basic layout key of the keyboard of FIG. 3 as described, infra. Thereafter, the processing proceeds to point 14 where, in accordance with the predetermined programming stored in the ROM of the system of FIG. 2, the active area of the first basic layout is indicated by a flashing asterisk or by any other suitable form of highlighting, such as, causing its outline to blink or brightening of total active area. Generation of the composite character proceeds to points 16, 17 wherein a first basic character is selected by the depressing of the appropriate basic character and character selection keys in FIG. 3 as will be described, infra. A basic character is always selected by a two step process wherein the basic character key of FIG. 3 containing the desired character is first depressed and thereafter the character selection key is depressed which chooses the particular character of the eight which are on the top and front faces of each basic character selection key. The choosing of the desired basic character from the eight on the face of the basic character selection key is illustrated in FIG. 1 by the expression "numeral key (1-8)." The generation of the composite character proceeds to point 18 wherein the second area of the first basic layout is now indicated as being active by the flashing asterisk. The generation of the character proceeds to point 20 wherein a second basic layout is chosen for inclusion within the active area of the first basic layout which is indicated at point 18 as being active by the flashing asterisk. At this point it should be noted that it would be also equally possible to choose a basic character for inclusion within the active area at point 18 if another composite character was being generated. The generation of the character proceeds to point 22 wherein the second basic layout which has been selected at point 20 is displayed within the active area as indicated at point 18. The generation of the character proceeds to points 24, 25 where a second basic character is selected for inclusion within the active area of the second basic layout as illustrated at point 22. The generation of the character proceeds to point 26 wherein the selected second basic character is included within the active area as indicated at point 22 and the second area of the selected second basic layout is indicated as being active by the flashing asterisk. The generation of the character proceeds to points 28, 29 wherein a third basic character is selected for inclusion within the active area of the second basic layout which is active as illustrated at point 26. Finally, at point 30, the composite layout which is the combination of the two selected nested basic layouts is removed to display just the generated composite character, leaving stored in the memory associated with the display device, only the generated character. The codes of the keys pressed for the creation of each character at steps 12, 16, 17, 20, 24, 25, 28 and 29 are stored in a text memory where an encoded representation of the synthesized text is saved for future display recreation or for external storage of the composed text in a floppy disc or other device.

As is apparent from the foregoing example which illustrates the overall operational sequence of the present invention in creating a composite character by the selection of basic layouts and basic characters, the selection of each basic character for inclusion within the active selection area of a selected basic layout requires that the basic character or basic layout be properly dimensioned for inclusion within the defined active selection area. It is necessary that a mechanism must be built into the system of FIG. 2 to automatically dimension the selected characters or basic layouts properly within the boundaries of the active selection area of the selected basic layout. One manner of accomplishing this task would be to provide memory storage for each of the pixels of each of the 256 possible characters for display within all of the possible nestable permutations of selection areas of the 15 basic layouts. While this procedure is implementable, it is an inefficient usage of memory.

In accordance with the present invention, orthogonal compression coefficients are stored in association with each selection area of each of the basic layouts to provide proper "scaling" information which ensures that a selected character or basic layout will be properly dimensioned within any one of the selection areas. The pixels which define the boundaries of a basic layout are not overwritten with character information. The effect of the orthogonal compression coefficients stored with each basic layout, which scale a selected basic character or a basic layout to be nested within the active selection area of a current basic layout along the X and Y axes of the display device, is to eliminate selected pixels from display which are stored in memory of each of the 256 basic characters or pixels from a full size basic layout. For example, if it is assumed that the active area of a selected basic layout is to be scaled in the X and Y directions by a factor of 2, it will be necessary to eliminate from display on the display screen every other pixel within the memory storage of the selected basic character along the X and Y axes. This process is described, infra, with regard to FIG. 7 and FIG. 16. The same scaling also occurs for pixels defining the boundary of a basic layout which is selected for display in an active area of the current basic layout having X and Y compression coefficients of 2.

Figure 2:
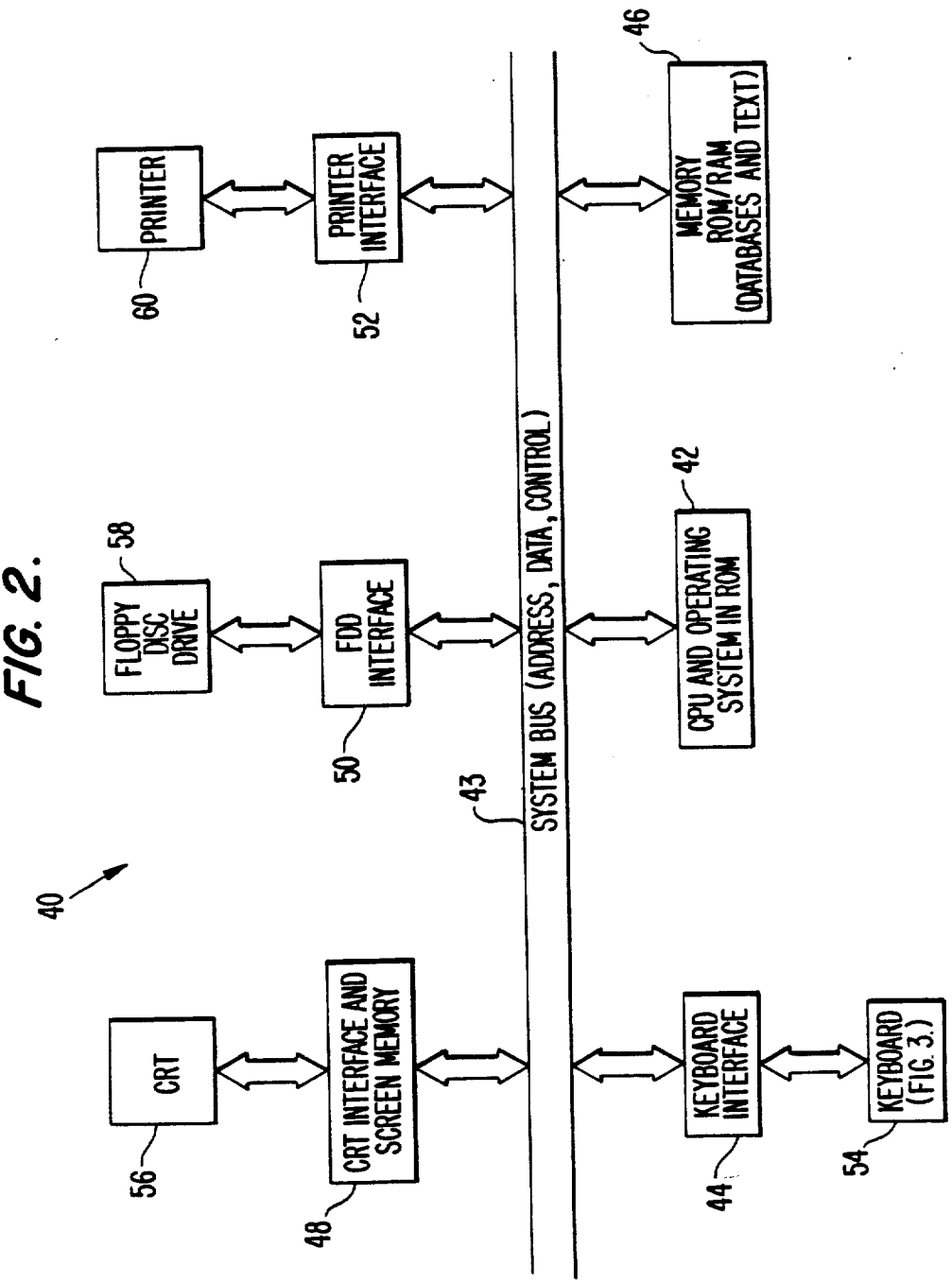
FIG. 2 illustrates a system schematic of the present invention.

FIG. 2 illustrates a suitable hardware implementation of the present invention. The system 40 has a general architecture similar to commercially available computer systems or word processing systems with a graphics capability. A central processing unit 42 which contains a suitably programmed microprocessor or any other known type of processing unit controls the overall operation of the system. The function of the central processing unit 42 is described, infra, with regard to the flowcharts of FIGS. 14–18. A system bus 43 is coupled to the CPU 42, keyboard interface 44, memory 46 which contains ROM and RAM for databases and text storage, a CRT interface and screen memory 48, a floppy disk drive interface 50, and a printer interface 52. The keyboard interface 44 is coupled to a keyboard 54. A suitable layout of a keyboard for implementing the present invention is described, infra, with regard to FIG. 3. The CRT interface and screen memory 48 is coupled to a CRT 56 which functions as the display device illustrating the present invention. The detailed interaction of the CPU 42, memory 46, which, inter alia, stores basic characters and layouts and screen memory 48 to generate composite characters in the sequence described, supra, with reference to FIG. 1 is described, infra. However, it should be noted that the final composite character code is stored in text memory 46, and is readily transmittable via the system bus 43 to the floppy disk drive 58 and printer 60 for storage or reproduction. Additionally, the composite characters may be transmitted by the system bus to other local or remote processing devices. The CRT has a display area upon which selected basic layouts and basic characters are displayed in accordance with the invention as described in detail, infra. The floppy disk drive and interface 50 is coupled to a floppy disk and drive 58 of conventional construction for, inter alia, storing of generated composite characters. The printer interface 52 is coupled to a printer 60 of conventional construction for, inter alia, printing generated composite characters. The differences between the system of FIG. 2 and commercially available graphics systems and word processing systems is in the operation of the central processing unit 42 in conjunction with memory 46 and CRT interface and screen memory 48. A suitable liquid crystal display (LCD), or any other pixel addressable display could replace the CRT 56.

The memory 46 for storing the basic characters and the screen memory 48 for storing the selected basic characters to be displayed within the areas of a basic layout is in the form of an N×M matrix of storage locations for the storage of pixels. While any suitable storage matrix may be used, an embodiment of the present invention as described herein utilizes a 32×32 matrix memory in ROM for storing each of the individual basic characters as illustrated in FIG. 13 in the ROM part of the memory 46. The screen memory (display buffer) contains an identical 32×32 matrix in random access memory (RAM) which is addressed identically to the ROM portion of the memory 46 which stores the individual basic characters. The storage of the selection areas of each basic layout is in parameters which are an X axis coefficient of compression Xc, a Y axis coefficient of compression Yc and the coordinates of an origin Xo, Yo.

FIG. 3 illustrates a suitable implementation of a keyboard 54 which may be used with the present invention. It should be understood that the keyboard of FIG. 3 illustrates one possible organization with other possible organizations being within the scope of the invention. The overall function of the basic keyboard is to permit the selection of any one of the 15 basic layouts by the depressing of the appropriate basic layout selection key 62 to choose the layout illustrated on the top surface of the key in accordance with the basic layouts which are individually selectable as discussed in conjunction with FIG. 6, infra. In addition, an "overlap" key is provided enabling the operator to display more than one character(s) superimposed in the same area of a given layout. A total of 32 basic character selection keys 64 are provided for individually choosing groups of eight basic characters which include the desired basic character for display in the active selection area of a basic layout. A total of 256 basic characters, as illustrated in FIGS. 5A and 5B, are displayed on the front and top surfaces of the individual basic character selection keys 64.

One suitable form for an individual basic character selection key 64 is illustrated in FIG. 4. The present invention is not limited to the basic character selection key 64 as illustrated in FIG. 4. The top surface 70 contains four rectangular areas 72 and the front surface 74 contains four rectangular areas 72 which individually contain a different one of the 256 selectable basic characters as described in detail, infra, with regard to FIGS. 5A and 5B. Directly above each of the individual rectangular areas 72 is a number between 1 and 8 which associates the particular rectangular box 72 with the character selection key 66 of FIG. 3. Thus, to choose the basic character contained within the rectangular box 72 associated with the number 1, the basic character key 64 would be depressed followed by the depressing of the character selection key 66 identified by the number 1 as illustrated in FIG. 3. It is within the scope of the present invention to vary the number and layout of basic characters on the individual basic character selection keys 64. Any variation in the number of individual basic characters displayed on a single basic character selection key 64 must be changed in conjunction with the number of character selection keys 66 of FIG. 3. Thus, a basic character is selected for display by locating the desired basic character on one of the 32 basic character selection keys 64, depressing that key, and thereafter depressing the numbered character selection key 66 which has a number identical to the number in association with the selected basic character to cause the desired basic character to be displayed. Additionally, the keyboard may contain other command selection keys 68 for performing diverse functions which are necessary for the operation of the system. These commands are not part of the present invention and will not be discussed hereinafter.

Figure 5A:
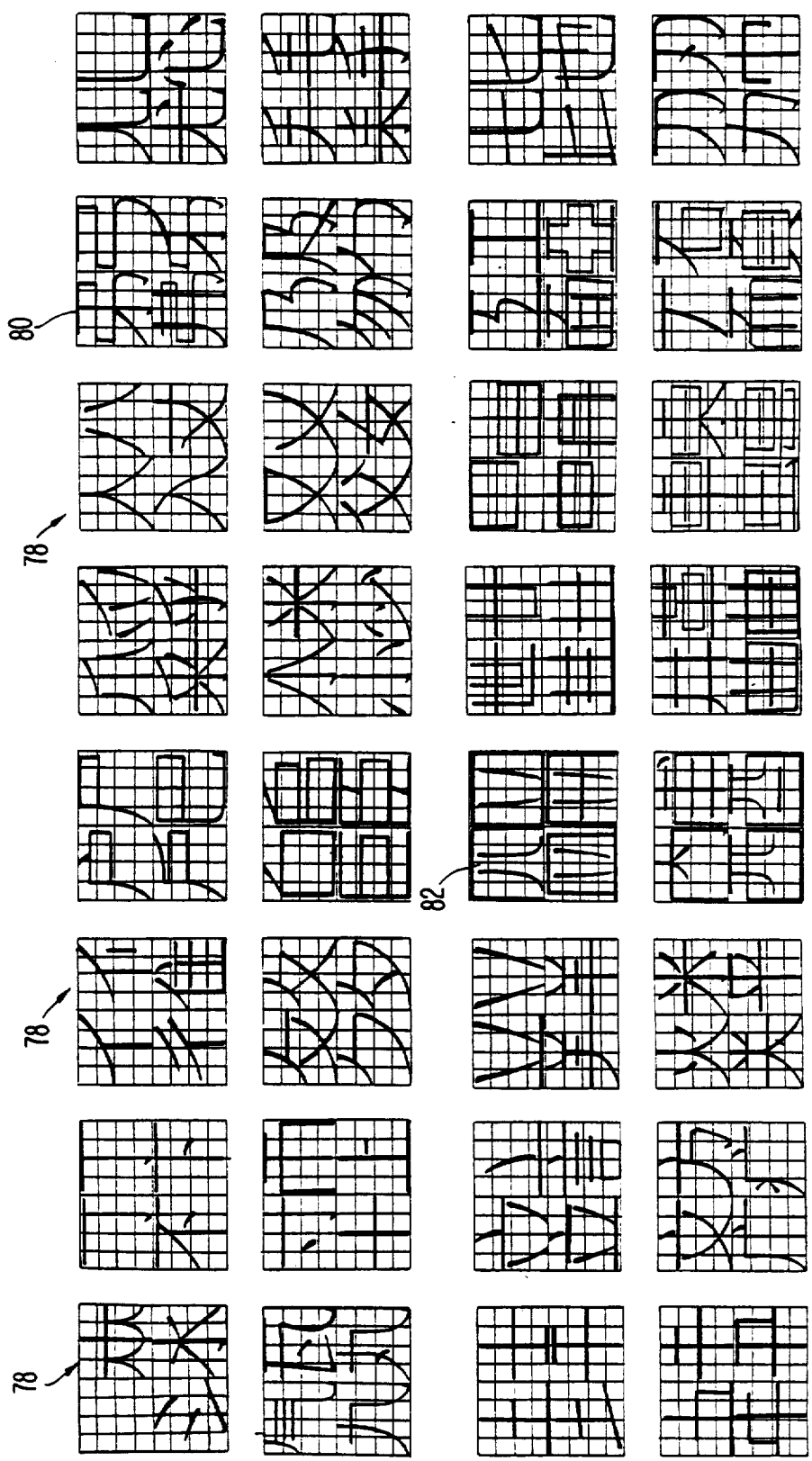
FIGS. 5A and 5B illustrate 256 basic characters which may be selected by the 32 basic character selection keys and 8 character selection keys of FIG. 3.
Figure 5B:
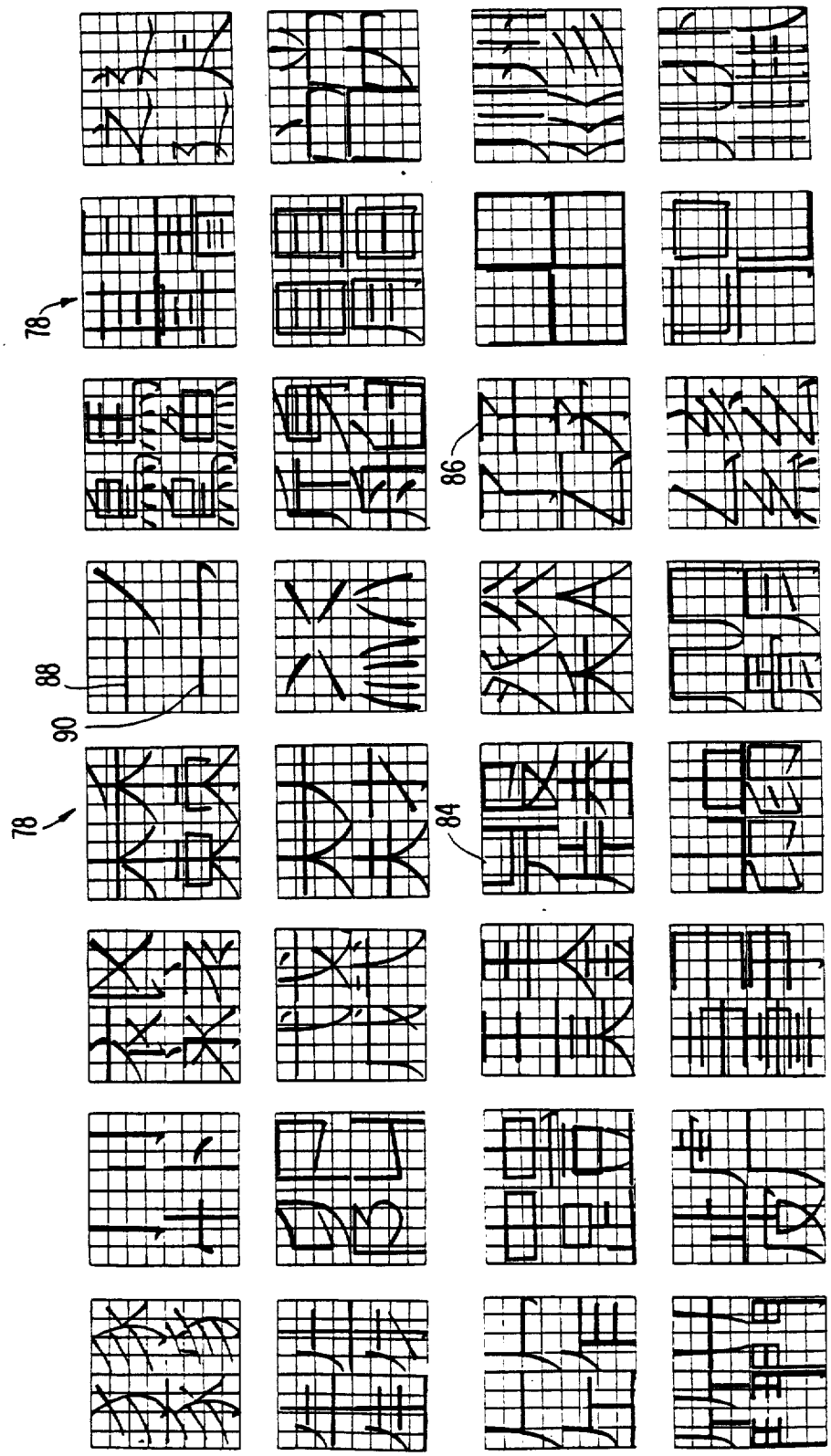

FIGS. 5A and 5B illustrate the 256 basic characters which are selectable by the 32 basic character selection keys 64 and the 8 character selection keys 66 of FIG. 3 as discussed, supra. Most of the individual basic characters 78 are radicals which in ideographic languages express a single idea. For example, basic characters 80–86 are radicals expressing a single idea. A few of the basic characters 78 are comprised of a single stroke. For example, basic characters 88 and 90 consist of a single stroke which may be used to refine or change the meaning of the idea expressed by another basic character. It should be clearly understood that the breakdown between the number of radicals and the number of single strokes contained within the basic characters is a matter of choice in implementing the present invention. The term basic character as defined, supra, covers a mixture of radicals and single strokes.

Figure 6:
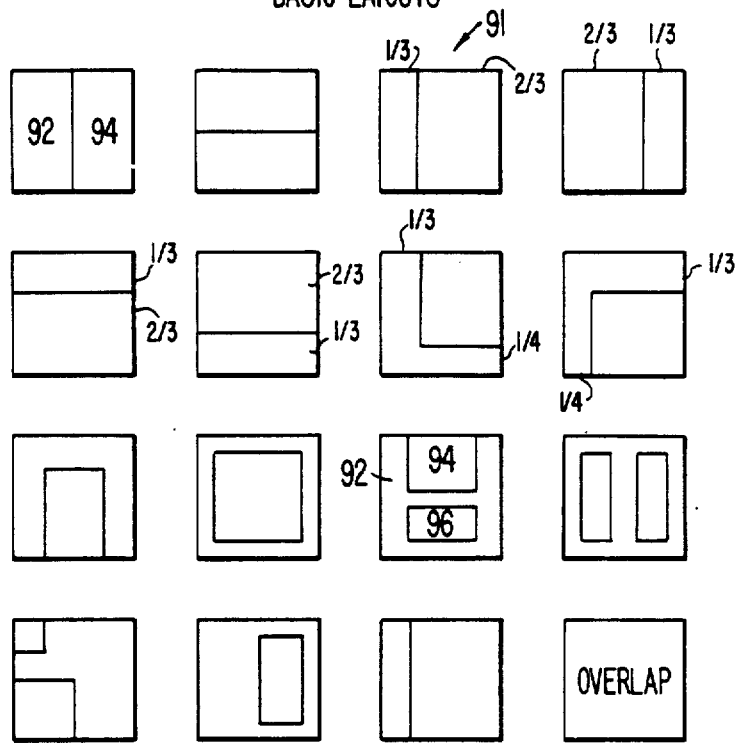
FIG. 6 illustrates the 15 basic layouts and an overlap key which may be selected by the basic layout selection keys of FIG. 3.

FIG. 6 illustrates 15 basic layouts which may be chosen by the depressing of the appropriate layout key 62 of FIG. 3. The parameters of each basic layout are stored in storage locations implemented in the ROM section of the memory 46. The ROM section of the memory 46 for storing the basic layouts is referred to, infra, as the Layout Data File (LDF). In accordance with the embodiment of the invention as described herein, each basic layout contains up to three selection areas 92, 94, and 96, as illustrated in FIG. 6. The display of a basic layout is produced by the processing in a manner described, infra, of the parameters Xc, Yc, Xo, Yo for each of selection areas of a selected basic layout. The number of pixels to be displayed out of the total possible number of pixels in a full size display of a basic layout is governed by the orthogonal compression coefficients Xc, Yc. The location of the selected basic layout is governed by the origin Xo, Yo as discussed, infra. It should be understood that the number of basic layouts and the number of areas within the basic layouts is a matter of design choice.

By defining the basic layouts with the orthogonal compresion coefficients Xc, Yc and origin Xo, Yo for each of the selection areas, minimal memory is utilized. Moreover, as described in conjunction with FIG. 18, infra, the use of compression coefficients and the origin to define the selection areas also permits the generation of one selection area contained totally within the display of another selection area such as element 97.

It should be understood that the basic layouts are chosen to define those areas on the display area of the CRT 56 within which it is statistically most probable to place a basic character in the generation of a composite character. The basic layouts are derived from an empirical study of the particular language for which composite characters are being generated.

The preferred implementation of the character memory 46 and screen memory 48 is a 32×32 matrix which permits the storage of 1,024 pixels of display information. When a single basic character 78 is chosen for display on the CRT 56 to produce the display of a composite character, which is identical to the basic character, it is not necessary to scale the number of pixels which are displayed from the character memory since the display of a basic character prior to the display of a basic layout is always scaled by X and Y coefficients of compression of 1.

When a composite character is generated from the placement of at least two basic characters within a basic layout, it is necessary to scale the number of display pixels to be stored in the screen memory 48 which are fetched from the pixel storage locations of the respective basic characters of the ROM section of the memory 46 in proportion to the ratio of the number of pixels contained within the selection area within the basic layout within which a basic character is to be placed with respect to the total number of pixels contained in the screen memory 48. The present invention implements basic character scaling by processing of orthogonal compression coefficients Xc and Yc stored for each selection area of the selected basic layout. The number of pixels from the chosen basic character to be displayed along the X and Y axes of the CRT 56 is con-trolled by the orthogonal compression coefficients in a manner described in conjunction with FIGS. 16A and 16B, infra. The parameters of each basic layout are addressed in the ROM section of memory 46 by the address LC generated by depressing the basic layout key 62 as described in conjunction with FIG. 9C.

Figure 7:
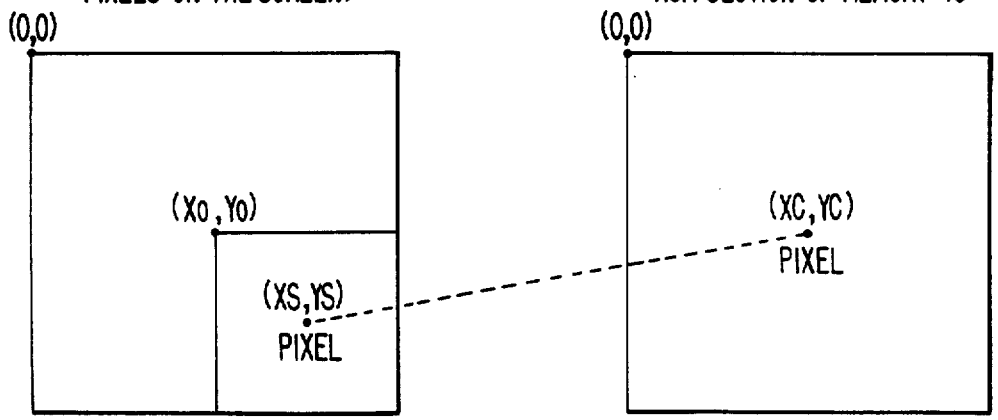
FIG. 7 illustrates the correlation of coordinates between a pixel of an individual basic character in a character memory and a pixel in the screen memory of the display device.

FIG. 7 illustrates the relationship between the pixels within the character memory 46 for storing each of the 256 basic characters and pixels within the screen memory 48 which stores the pixels to be displayed on the CRT 56 as a function of the X and Y axes compression coefficients and the origin of the active selection area on the CRT 56. The relationship between each of the pixels within the character memory 46 defined by the X and Y coordinates (XC,YC) and each of the pixels within a selection area of the CRT 56 which has been selected to display a basic character as defined by the X and Y coordinates (Xs,Ys) is mathematically defined by equations (1)–(4) as illustrated in FIG. 7. The dotted line connecting the point XC, YC in the memory 46 to the point XS, YS of memory 48 illustrates the correlation between these two points. In the example as illustrated, the X compression coefficient Xc is 2, the Y compression coefficient Yc is 2 with the origin defined by the X and Y axis coordinates Xo, Yo. With this example, to properly scale a basic character for display within the selection area of the screen memory 48 having an upper left-hand origin (Xo,Yo), every other pixel of data stored within the selected basic character in the ROM section of the memory 46 along both the X and Y axis must be discarded. Assuming that the screen memory 48 and character memory 46 each are a 32×32 matrix, each pixel address (XS,YS), within the screen memory 48 stores the pixel data (either "1" or "0") for only particular points within the character memory 46 as addressed by the X and Y axes coordinates (XC,YC) defined by equations (1) and (2). Thus, the character pixel to be transferred to the screen memory 48 at coordinates (24,24) corresponds to the pixel having the coordinates (16,16) in the ROM section 46, if both compression coefficients are 2. Given the mathematical relationships expressed by equations (1)–(4), it is always possible to determine the pixel coordinates within the character memory 46 and the pixel value which is to be stored within the screen memory 48 at address (XS,YS) by solving equations (1) and (2) defining (XC,YC) by substituting in the known values of (XS,YS) and the compression coefficients. The process for determining the actual memory map for each of the pixels within the 256 basic characters is described, infra, in conjunction with FIGS. 13A and 13B.

FIG. 8 illustrates a memory map of the layout data file (LDF) which is the memory storage of scaling information for defining the origin, (Xo,Yo) and the horizontal and vertical compression coefficients Xc, Yc for each of the selection areas within the 15 basic layouts as described, supra, with regard to FIG. 6. In accordance with the present embodiment of the invention, a total of up to three areas are contained within each basic layout. Each selection area within the basic layout is defined by the origin and compression coefficient information as illustrated in the first selection area of the layout data file 98. In the present embodiment, each basic layout contains at least two selection areas. As illustrated in FIG. 8, the LDF is allotted four selection areas for each basic layout with the fourth selection area always being loaded with zeroes in the embodiment as discussed herein. However, it should be understood that the present invention is not limited to any particular number of selection areas within a basic layout. Moreover, the defining of the origin as the upper left-hand corner of each selection area is not required for the practicing of the present invention. As illustrated, the basic layouts are stored in fifteen contiguous memory locations with the LDF preferrably being implemented in the ROM section of memory 46.

FIGS. 9A, 9B and 9C, respectively, illustrate a memory map of the current area origin file (CAOF), current area compression file (CACF) and selected basic layout code (LC). The CAOF contains four bytes with the first and second bytes respectively being the X and Y coordinates of the origin (Xo,Yo) as discussed in conjunction with FIG. 7, supra. The third and fourth bytes store all "zeroes" to facilitate the implementation of the algorithm. The CAOF stores the origin of the active (current) selection area of the basic layout displayed on the CRT 56. The CAOF is implemented in the RAM section of the memory 46. The CACF contains four bytes of information with the storage of duplicate values of the X compression coefficient and Y compression coefficient of the active (current) selection area of the basic layout displayed on the CRT 56. The CACF is also implemented in the RAM section of memory 46. The memory location LC stores the address of the selected basic layout with the higher four bits of the byte being able to assume values between zero and 15 as illustrated. The LC is also implemented in the RAM section of the memory 46. The function of the CAOF, CACF and LC in the processing of information by the present invention is described, infra.

FIG. 10 illustrates a memory map of the current character layout file (CCLF). The function of the CCLF is to store the parameters of the basic layouts as selected for display on the CRT 56 with the exception of the active area as described, supra, in conjunction with FIG. 1. The CCLF is implemented as a LIFO stack which stores the origin and compression information of the selection areas of the selected basic layouts. With the exception of the active selection area, the CCLF stores information defining the origin and compression coefficients of each of the selection areas of the selected one or more basic layouts which have not yet been activated to accept the display of a basic character or another basic layout. The CCLF is automatically pushed down a fixed number area storage locations equal to the number of selection areas within the selected basic layout with the origin and compression data of the first selection area of the selected layout parameter being subsequently placed in the CAOF and CACF files. Thus, the selection of a basic layout to be initially displayed or nested within the active selection area of a previously selected basic layout automatically pushes the CCLF stack down a number of selection area locations equal to the number of selection areas within the chosen basic layout. Additionally, as each successive selection area of the basic layout is processed with the entry of a basic character therein, the CCLF stack is pushed up and the origin and compression data stored in the top CCLF area are respectively placed in the CAOF and CACF as described, supra.

Figure 11:
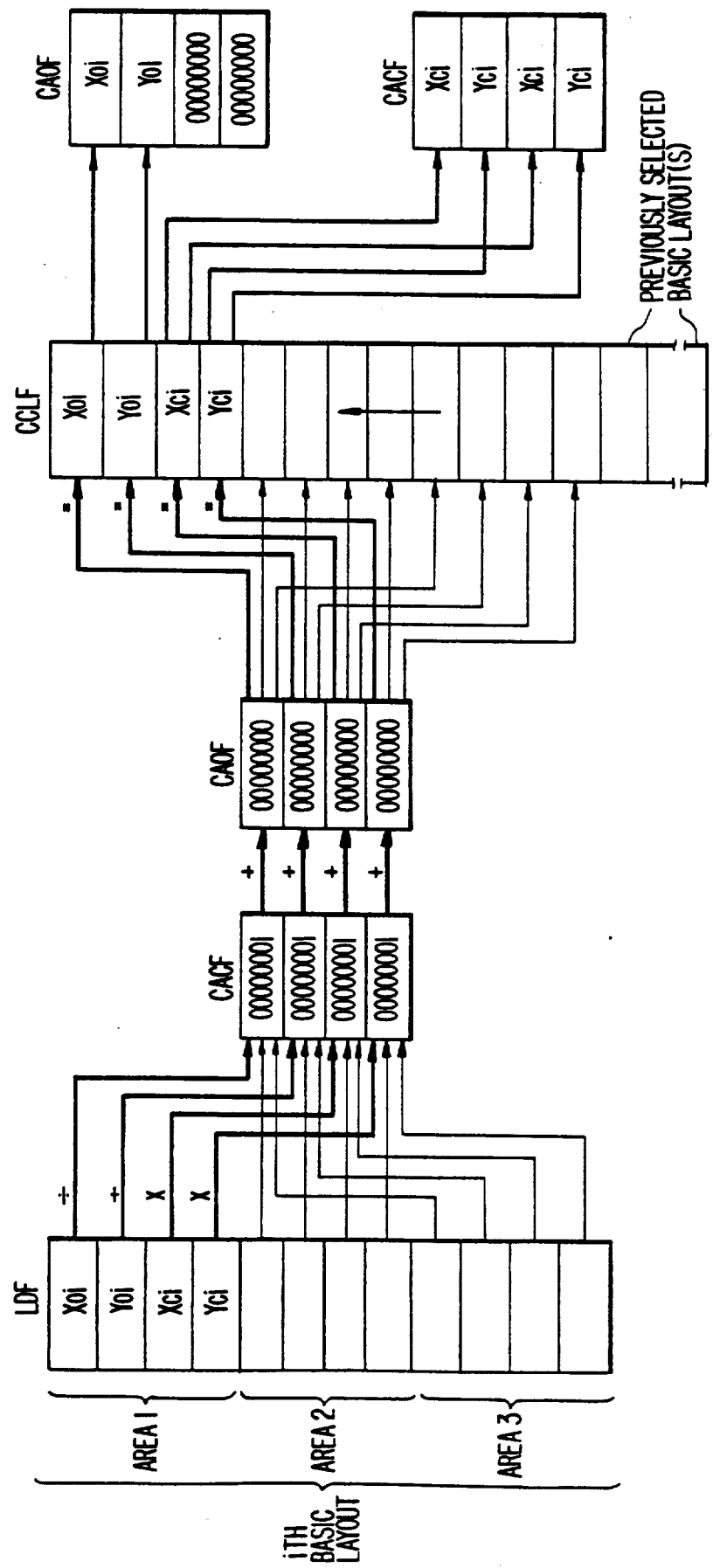
FIG. 11 is a diagram of the processing of information from the layout data file, to the current character layout file, current area compression file and current area origin file when the first layout is selected.

FIG. 11 illustrates the information flow between the LDF, CCLF, CACF, and CAOF when the first basic layout is selected for display on the CRT 56 during the processing of the first selection area of the selected basic layout. The right hand positions of the CAOF and CACF in FIG. 11 represent the final state during the processing of the first selection area of the selected basic layout. The mathematical operators disposed between the LDF, CACF, CAOF and CCLF represent the mathematical operations which are performed on the contents thereof. The arrows which are heavier are the operations which occur first in time. Thin arrows represent operations which occur later in time. The selection of any one of the 15 basic layouts causes the loading of the CCLF from the LDF of the pertinent parameters for defining each of the selection areas within the selected basic layout with the exception of data from the first selection area which is automatically loaded into the CAOF and CACF. As illustrated, the CACF and CAOF are loaded with the initial orthogonal compression coefficients of 1, 1 and origin 0, 0 prior to selection of a basic layout. As has been described, supra, in the embodiment described herein, a maximum of three selection areas are allotted within each selected basic layout. The depressing of one of the 15 basic character selection keys 64 causes the loading of information from the LDF into the CCLF. Every selection of a basic layout is processed as a nested layout with the initial conditions being used to nest the first selected basic layout within the entire display area of the CRT 56 without compression. If a basic layout is to be nested within the active selection area of a previously selected basic layout, the remaining unactivated areas of the previously selected basic layout will be disposed within the stack which constitutes the CCLF below the current basic layout. The information flow sequence for the nesting of a basic layout within the active selection area of another basic layout is described, infra, with regard to FIG. 12. FIG. 11 illustrates the situation where the first basic layout has just been selected. At that time, the first selection area parameters within the current basic layout are loaded into the CAOF to store the X and Y origin coordinates, and in the CACF to store the X and Y compression coefficients as illustrated in FIG. 11. After the information transfer between the CCLF, CACF and CAOF as illustrated by the heavy arrows is completed, the stack which implements the CCLF has the parameters for the second and third areas stored in lower locations as illustrated by the lighter arrows. These parameters are shifted upward into the upper two locations. Any other parameters pertaining to previously selected basic layouts are also popped upward at that time. As each selection area within the current basic layout is filled with a desired basic character or another layout, the stack continues to pop upward the remaining selection area parameters within the current basic layout which are stored in the CCLF after the parameters at the top of the stack are loaded into the CAOF and CACF. The actual loading in the screen memory 48 of the pixels from a selected basic character to be displayed is in accordance with the pixel processing sequence described, supra, with regard to FIG. 7 between the character memory 46 and screen memory 48 and infra with regard to FIG. 16. However, it should be noted that each pixel of a basic character or another basic layout to be stored within the active selection area of the current basic layout is defined as a function of the origin (Xo,Yo) stored in the CAOF in the upper left-hand corner of the active selection area of the current basic layout, the X and Y compression coefficients Xc, Yc for that active selection area which are stored in the CACF and by the processing of each of the pixels (XC,YC) within the matrix memory of the character memory 46 for each pixel (XS,YS) within the active selection area.

It should be noted that the invention permits the selection of any one of the 256 basic characters as a composite character. In this situation the selected basic character is processed with X and Y compression coefficients of 1 which places every pixel from the selected basic character within the screen memory for display.

Figure 12:
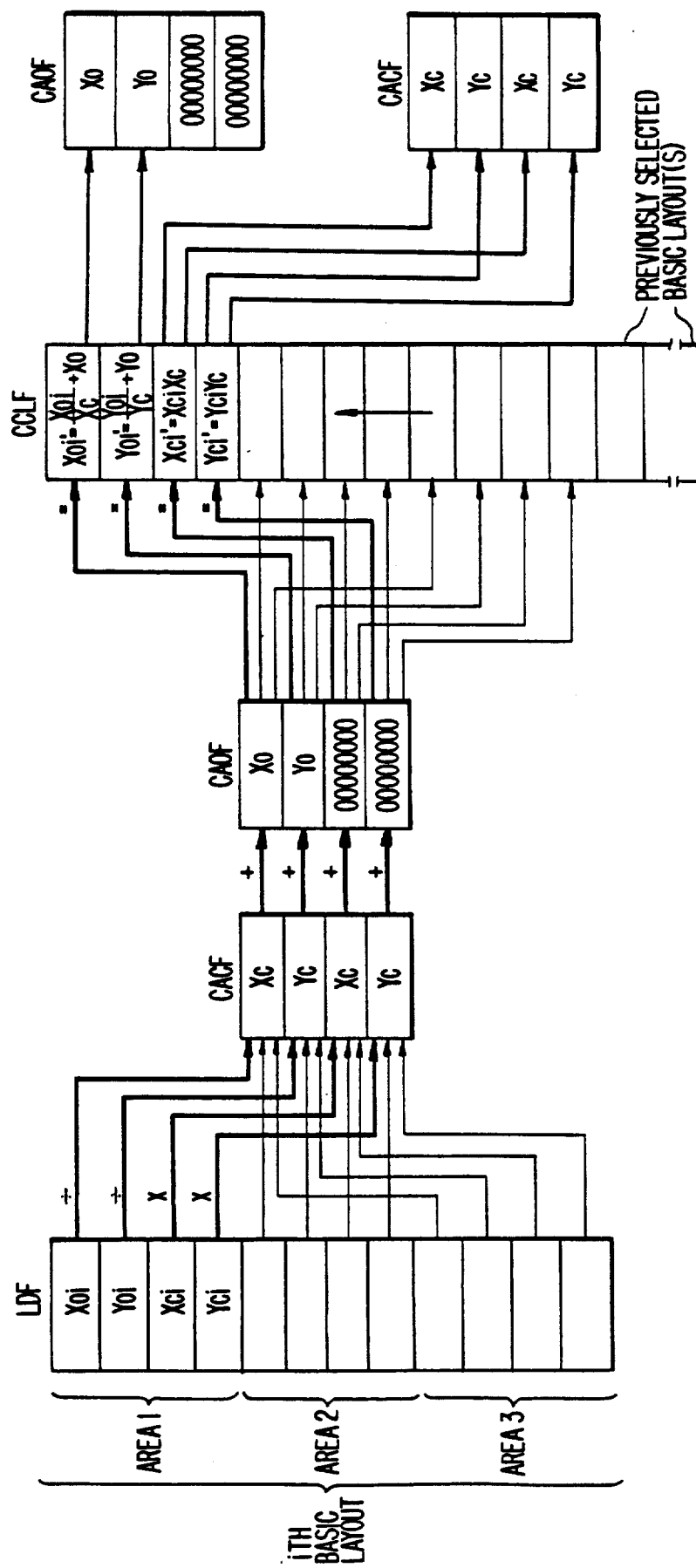
FIG. 12 is a diagram of the processing of information from the layout data file, to the current character layout file, current area compression file and current area origin file when a layout is nested within another layout.

FIG. 12 illustrates a diagram of the information flow between the LDF, CACF, CAOF, CCLF, CAOF and CACF when one of the basic layouts is selected for display within the active selection area of the current basic layout. Like in FIG. 11, the heavy arrows represent the first information transfers to occur while thin arrows represent subsequent transfers. In this circumstance, it is necessary to scale each of the selection areas of the to be selected basic layout for display within the active selection area of the current basic layout by both the origin and the X and Y compression coefficients of the active area of the current basic layout. This scaling involves the processing of the origin and X and Y compression coefficients of both the current active area and the areas of the basic layout to be selected. As illustrated, the contents of the LDF represent the ith basic layout, which is one of the 15 possible basic layouts illustrated in FIG. 6, that is to be displayed within the active selection area of the current basic layout. For purposes of discussion, it is assumed that the ith basic layout has three areas which is the maximum number of areas contained in the basic layouts illustrated in FIG. 6. The arrows connecting the LDF to the CACF which are identified by a mathematical division or multiplication sign identify the mathematical operation to be performed on the contents of the respective storage locations within the LDF and CACF which are respectively identified by the tail and head of the arrows. Each of the parameters of selection areas 1-3 are sequentially processed in time with the processing of the first selection area being completed first. Thereafter, the parameters of the second selection area are processed by the same mathematical operations indicated by the arrows between the LDF and the CACF of the first area. Finally, the processing of the third selection area is completed after the processing of the second selection area by the same mathematical operations. The division of the origin coordinates, Xoi, Yoi by the coefficients of compression Xc, Yc, which are respectively stored in the first two locations of the CACF, scales the origin of the first selection area of the newly selected basic layout by the coefficients of compression of the active selection area. The multiplication of the coefficients of compression of the first selection area within the basic layout to be selected (Xci, Yci) by the current coefficients of compression (Xc, Yc) of the active selection area produces the resultant scaling coefficient to be used for scaling of any basic character to be placed within the first selection area of the ith basic layout. The contents of the CACF are added to the CAOF as illustrated to translate the origin of the first selection area of the ith basic layout with respect to the origin of the active selection area of the current basic layout. The contents of the first four locations of the CCLF, which are respectively designated Xoi', Yoi', Xci', and Yci' correspond functionally to the contents of the CCLF as described, supra, in conjunction with FIG. 10. The mathematical definition of the aforementioned quantities stored in the CCLF is defined within the appropriate boxes as illustrated regarding the first selection area.

The contents of the CCLF are respectively stored in the CAOF and CACF in the same manner as described, supra, with regard to FIG. 11. The stack of the CCLF is sequentially popped in the manner described, supra, with regard to FIG. 11 as each selection area is processed to have a basic character displayed therein. Subsequent selection areas of the CCLF are sequentially processed with transfer to the CAOF and CACF always being from the top of the stack of the CCLF.

Figure 13B:
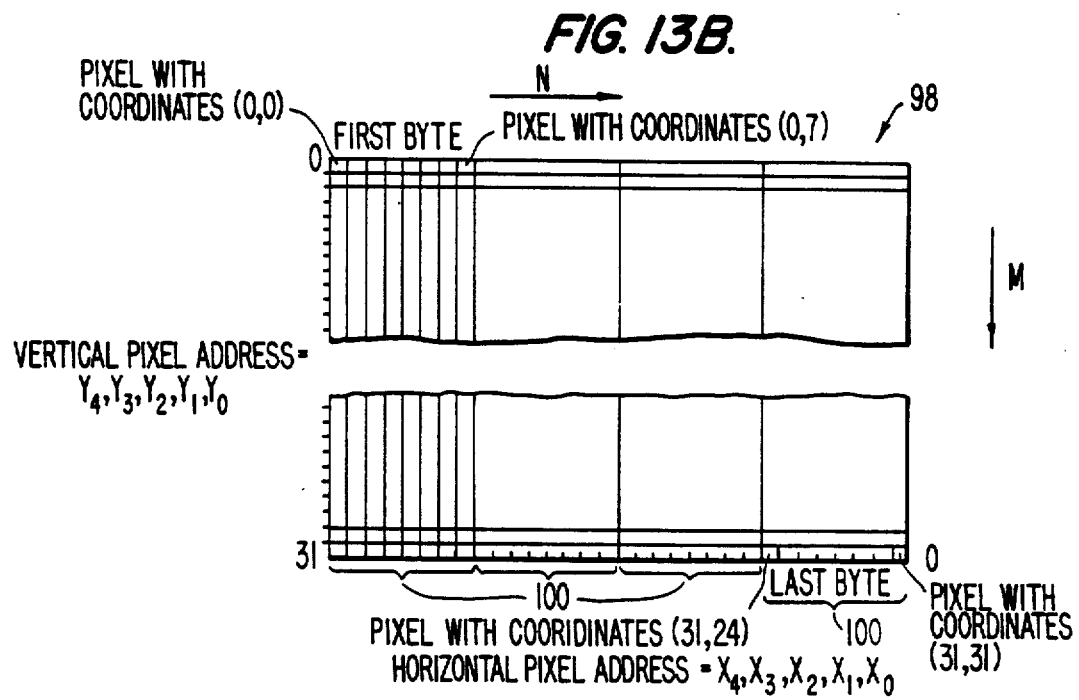

FIGS. 13A and 13B respectively illustrate a memory map of the 256 basic characters contained within the character memory 46 and a 32×32 memory map of the 1,024 pixels comprising each basic character. With reference to FIG. 13A, it should be noted that the each basic character matrix is configured with a total of 128 rows and 8 columns to permit byte addressing in a manner described, infra, with regard to the flowchart of FIG. 16. In FIG. 13A, the five most significant bits of the word CHAR address the particular 8 basic character group within which the to be selected basic character is located. These five bits are generated by the depressing of the basic character selection key 64. The remaining three least significant bits of the word CHAR, which are generated by the depressing of the face selection key 66, identify the particular character within the eight character group 64 selected earlier. Thus, the depressing of the combination of the basic character selection key 64 and the character selection key 66 addresses a particular basic character 98 out of the 256 possible basic characters which are choosable from the keyboard 54. With reference to FIG. 13B, it should be noted that each individual character 98 is comprised of a 32×32 matrix having a total of 1,024 pixels for defining each basic character. Because of the fact that the preferred form of the CPU 42 is microprocessor based, the fetching of an individual pixel within a selected basic character 98 is not normally possible because data fetches in microprocessors are byte oriented. Accordingly, bytes of character data are fetched by the $X_4$, $X_3$ address bits for further processing. The particular bit to be processed within the fetched byte defined by the $X_4$, $X_3$ address is discussed, infra, in conjunction with FIG. 16.

Figure 14:
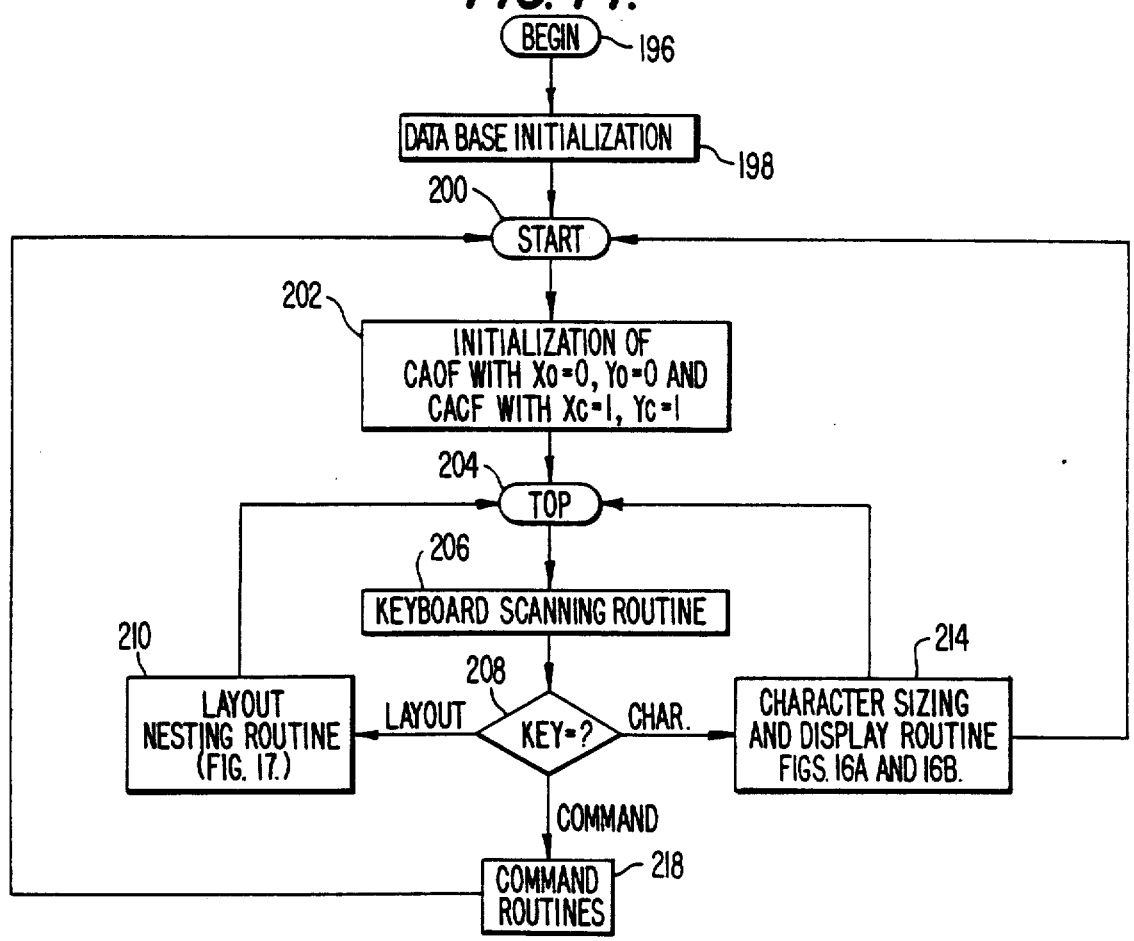
FIG. 14 is the overall flowchart of the processing of the system routines of FIG. 2.

FIG. 14 illustrates a flowchart describing the operation of the CPU 42 with regard to the processing of keyboard scanning, layout nesting, character sizing and display and command routines which are sequentially executed to perform the generation of composite characters in accordance with the present invention. It should be understood that the overall flowchart, as illustrated in Fig. 14, may be implemented in any central processing unit 42. However, because of expense, it is preferable that a suitably programmed microprocessor be used to execute the illustrated flowchart. In the illustrated flowchart, exclusive of the system initialization, the processing proceeds from the "BEGIN" point 196, which represents either a power on condition or system reset, to point 198 where the initialization of the variable data bases of the system 40 is performed. Initialization involves the setting of all of the various parameters of the algorithms in a condition for starting operation. The processing proceeds to "START" point 200 which is the reentry point from some of the routines discussed, infra. Processing proceeds from point 200 to initialization point 202 where the CAOF is loaded with an origin of 0,0 and the CACF is loaded with compression coefficients 1,1. Processing proceeds to point "TOP" 204 which is the reentry point from some of the routines discussed, infra. The processing proceeds to the keyboard scanning routine. The keyboard scanning routine 206 performs the overall function of detecting the selection of any of the keys on the keyboard 54 by detecting the code generated by the depressing of the keys, including the selection of a basic layout by the depressing of the basic layout key 62 and the selection of a particular one of the 256 possible basic characters by the sequential depressing of the basic character selection key 64 and the character selection key 66. The keyboard scanning subroutine is conventional and is not further described. The processing proceeds from keyboard scanning subroutine 206 to decision point 208 where a determination is made as to what type of key has been pressed. If a basic layout has been keyed for initial display on the CRT or within the active selection area of the current basic layout, the program proceeds to point 210 where the layout nesting routine is processed. The details of the layout nesting routine are described, infra, with regards to FIG. 17. If a basic character selection key 64 or character selection key 66 has been selected, the program branches from point 208 to the character sizing and display routine 214. The character sizing and display routine, which is described, infra, with regard to FIG. 16, performs the scaling of the selected basic character within the active selection area of the current basic layout. Processing from the character sizing and display routine branches to point 200 only when the contents of the CCLF as described, supra, with regard to FIGS. 10 and 11, are empty which signifies that the last active selection area within the current basic layout has had a character placed therein. If the CCLF is not empty, the processing in the character sizing and display subroutine branches to point 204 as described, supra. If a command has been selected, the program branches from point 208 to the command routines 218 which are discussed in detail, infra, with regard to FIG. 15. The function of the command routines is to control the various system components such as the printer, floppy disk, as well as the editing functions initiated by the keyboard 54. They are used for functions other than the selection of basic layouts and basic characters. After servicing the command request, the program loops back to starting point 200 or 204 depending upon the executed command. Thus, it is seen that the central processing unit 42, which is preferably implemented in a low cost microprocessor, sequentially processes a series of routines.

Figure 15:
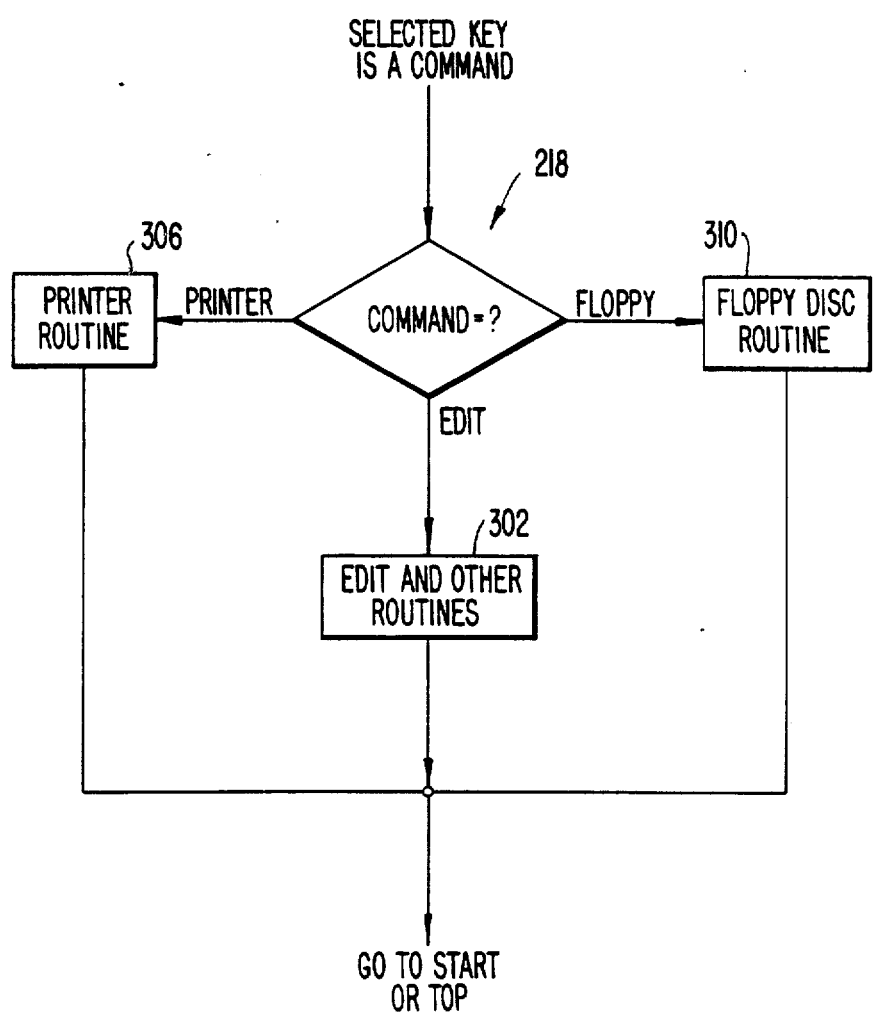
FIG. 15 is the basic flowchart of the command processing routines of FIG. 14.

FIG. 15 illustrates a suitable command routine structure. The entry point 218 is from decision point 208 were a determination has been made that a command has been entered. Prior to discussion of the command routine, it should be understood that any conventional command processing routine may be used for practicing the invention such as those conventionally used in word processing systems. It should be also understood that the commands are entered from the depressing of the command selection keys 68 as illustrated in FIG. 3. The program proceeds from decision point 208 (FIG. 14) to decision point 218 where a determination is made of the nature of the inputted command. If, at decision point 218, the command is to edit, or perform another operation not related to the printer or floppy disk drive, the program branches to point 302 where conventional routines are executed. If the entered command is a print command, the program proceeds to the print routine at point 306 where conventional routines for servicing the printer 60 are executed. If the command is a command pertaining to the floppy disk and drive 58, the program branches to decision point 310 where a conventional floppy disk routine is executed. After processing of the requested command, the program proceeds to points 200 or 204 of FIG. 14.

Figure 16A:
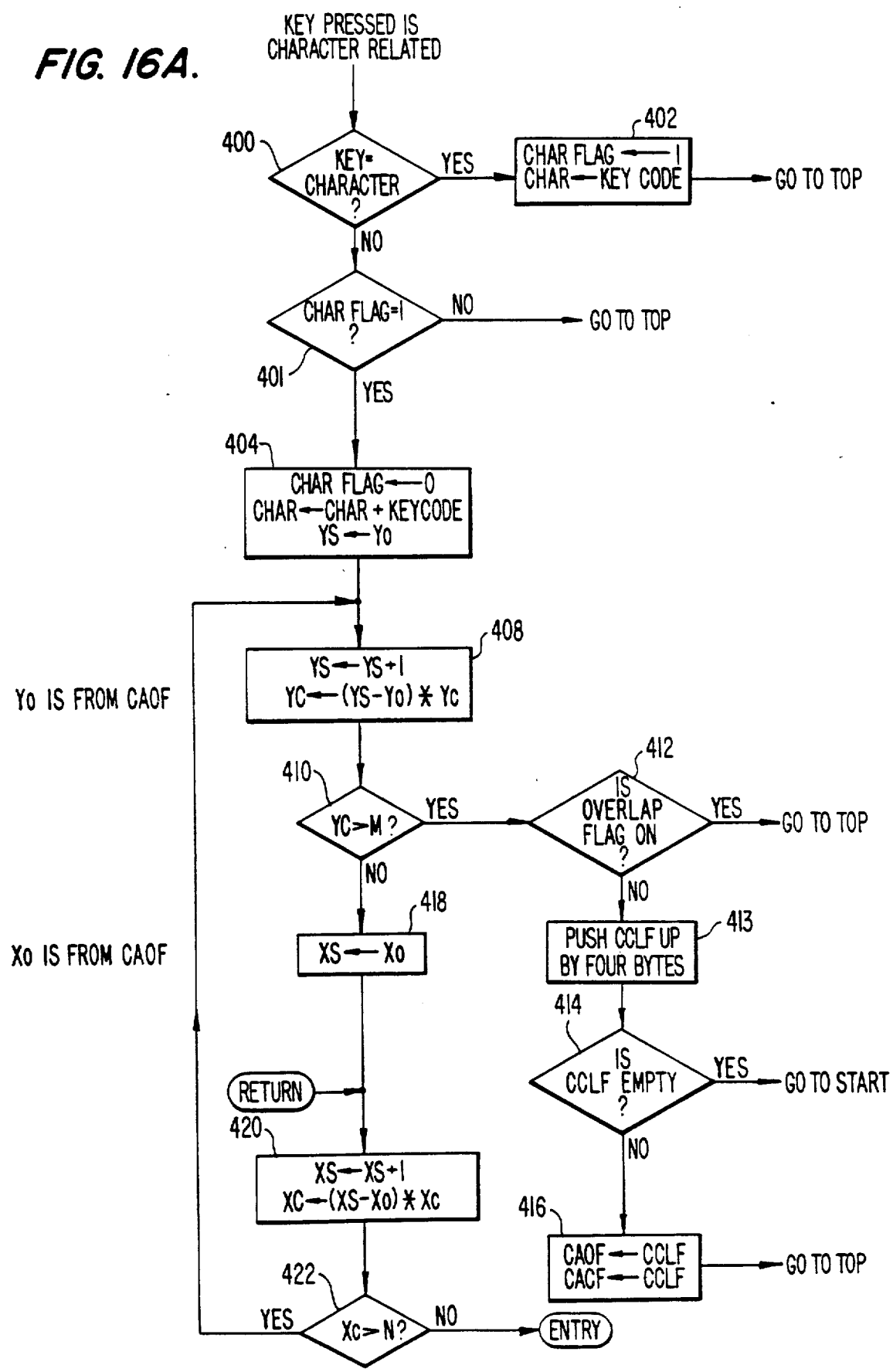

FIGS. 16A and 16B illustrate the character sizing and display routine 214. Upon entry into the character sizing and display routine 214, the program proceeds to decision point 400 where a determination is made whether a basic character selection key 64 or a character selection key 66 has been depressed. If the answer is "yes" at decision point 400, the program proceeds to point 402 where the character flag is set and location CHAR is set equal to the 8 bit code CCCCC000 used for encoding each of the 32 possible eight basic character groups which may be selected from the keys 64 of the keyboard 54 as described, supra, with reference to FIG. 3. It should be noted that only the five leftmost bits of the byte CHAR are used to encode the 1 of 32 possible selectable character groups. The program proceeds from point 402 to the point 204 as described in the main program illustrated in FIG. 14. If the answer is "no" at decision point 400, which means that the key was a character selection key (1-8) 66, the program proceeds to decision point 401 where the CHAR FLAG is examined to determine if a basic character key was depressed prior to the just depressed character selection key. If the flag is "0", the program rejects the key entered and returns to point 204, FIG. 14. If the flag is "1", the program proceeds to point 404 where the character flag is reset and location CHAR is incremented by the value of the character selection key code and stored as CHAR. The normal sequence of operation is the one in which the operator first selects a basic character selection key 64 followed by a character selection key 66. The depressing of the keys 64 and 66 out of sequence will cause a syntax error and entry will not be processed. Additionally at point 404, the Y origin, YO, of the active selection area of the selected basic layout is loaded into YS, the Y axis origin of the active selection area. The program proceeds to point 408 where the integer value of the Y axis address, YS, within the active selection area of the current basic layout is augmented by 1 and the corresponding address YC of the character memory 46 is computed in accordance with equation (2) of FIG. 7 as discussed, supra. The computed quantity YC is the Y axis address of the pixel in the character memory 46 of the currently composed character 98 which is to be stored in the screen memory at the address XS,YS. The program proceeds from point 408 to decision point 410 where a determination is made if the quantity YC is greater than M which is the maximum dimension of the screen memory 48 and basic character memory 46 along the Y axis. If the answer is "yes" at decision point 410, the program proceeds to decision point 412 where a determination is made if an overlap flag is on. If the answer is "yes" at decision point 412, the processing will continue in the same active selection area of the current basic layout. The overlap flag is set by the depressing the sixteenth key 62 of the keyboard 54. The setting of the overlap flag causes the active selection area to be in a condition to receive an additional basic character as an overlap for display in the active selection area by holding the contents of the CCLF, CAOF and CACF. If the answer is "yes" at decision point 412, the program proceeds to point 204 of FIG. 14 as described, supra. If the answer is "no" at decision point 412, the program proceeds to point 413 where CCLF stack is pushed up by four bytes. Afterwards, at point 414 a determination is made if the CCLF is empty. If the CCLF is empty, processing of a composite character is complete. If the answer is "yes" at decision point 414, the program branches back to point 200 of the main flowchart as discussed, supra, with regard to FIG. 14 where another composite character is to be generated. If the answer is "no" at decision point 414, the program proceeds to point 416 where the CCLF is popped to cause the next selection area's parameters Xo, Yo, and Xc, Yc to be respectively placed in the CAOF and CACF as discussed, supra, with regard to FIG. 12. The program proceeds from point 416 to point 204 as discussed above with regard to FIG. 14. If the answer is "no" at decision point 410, the program proceeds to point 418 where the quantity XS is set equal to the X axis origin Xo of the selection area. The program proceeds from point 418 to point 420 where XS is augmented by 1 and XC is calculated in accordance with equation (1) of FIG. 7 as described, supra. This step is analogous to the step discussed, supra, at point 408. The value XC is the X axis pixel address within the selected character which is to be stored in the screen memory matrix 48 at the address XS, YS. The program proceeds from point 420 to decision point 422 where a determination is made if XC is greater than N which is the number of pixels along the X axis in the screen memory matrix 48, and in memory 46 in the individual basic character sections 98 as illustrated in FIG. 13B described, supra. If the answer is "yes" at decision point 422, the program loops back to point 408 to begin the processing of the next horizontal line within the individual character 98. If the answer is "no" at decision point 422, the program branches to the cursor/character subroutine of FIG. 16B.

The function of the cursor/character routine is to transfer the pixel value ("1" or "0") which is stored in a selected character section of memory 46 at location of XC, YC as defined by equations 1 and 2 of FIG. 7 to the storage location in the screen memory 48 addressed by XS, YS. The pixel value is loaded into the carry bit of the processor from location XC, YC and then placed in location XS, YS by the sequence of eight steps. The basic character dot byte address is formed at point 424. The cursor/character subroutine has eight sequential steps. The value in location CHAR which is generated by the depressing of the keys 64 and 66, addresses the particular basic character which has been selected. The value represented by coordinates YC and XC is the address of a particular pixel within a selected basic character having an address in CHAR. A particular byte within the basic character containing a pixel to be selected is addressed by the value $Y_4Y_3Y_2Y_1Y_0X_4X_3$. This value represents the address of 1 of 128 bytes which are contained within the memory storage locations storing the pixels of the particular character which has been selected. As has been set forth, supra, because the preferred form of the CPU 42 is a microprocessor, the fetching of a particular pixel within the particular addressed character 98 must be fetched in the form of a byte. The program proceeds from point 424 to point 426 where the addressed character byte as defined at point 424 is fetched and loaded into the accumulator of the CPU 42 of the system of FIG. 2. The program proceeds from point 426 to point 428 where the accumulator is shifted left into the carry bit a number of times equal to the address value $X_2X_1X_0 + 1$ as those values are used to address the particular X axis pixel in the storage of an individual character 98 as illustrated in FIG. 13B. The effect of the shift is to rotate the actual pixel value stored in the desired pixel location into the carry bit of the accumulator where it can be stored for subsequent processing to permit its loading within the desired storage location (XS,YS) of the matrix in the screen memory 48. The program proceeds from point 428 to point 430 where the contents of the accumulator are zeroed and the carry bit is shifted right a number of times equal to the value $X_2X_1X_0+1$ and the accumulator contents are saved in a storage location designated as MLC which may be any available storage location in the RAM section of memory 46, or a register in the CPU 42. The program proceeds from point 430 to point 432 where the accumulator is loaded with "1"s and a "0" carry bit is rotated right a number of times equal to $X_2X_1X_0+1$. The program proceeds from point 432 to point 434 where screen memory address 48 is formed from the values of CURSOR, XS and YS, wherein CURSOR is a memory location holding the address of the current NxM matrix location on the screen memory. This quantity is set equal to CDB. The program proceeds from point 434 to point 436 where a logical AND operation of the contents of the accumulator and the CDB are performed and the result is saved in the CDB. The program proceeds from point 436 to 438 where a logical OR is performed of the contents of the MLC and the CDB. The result of the logical OR operation is stored in CDB. Effectively, the pixel value at the storage location CHAR YC,XC is stored into storage location CURSOR, YS,XS. The program proceeds from point 438 to point 420, to continue processing of X axis character pixels.

FIG. 17 is the layout nesting routine. At point 450 the selected layout is assumed to have only two areas and counter NA is set to two. This counter will be used later when parameters are transferred from the Layout Data File (LDF) to the Current Character Layout File (CCLF). At point 452 the CCLF is pushed down by 4 bytes to create space for the parameters of one of the two selection areas of the selected layout. The parameters of the other selection area will be stored over the parameters of the currently active selection area that have been left in the CCLF. These parameters are also in the CAOF and CACF. At point 454 the binary number in LC, which is the code of the selected layout, is examined. If the two most significant bits are both "1", it means that the selected layout has three selection areas, which is expressed by decision "no". In this case, the CCLF has to be pushed down an additional 4 bytes to create space for the parameters of the additional layout selection area. With this condition present, the program proceeds with the CCLF being pushed down 4 bytes. If the two most significant bits are not both "1", it means that the selected layout has only two areas and that no additional space is needed, and the program proceeds to point 460. At point 458 the NA counter that holds the number of selection areas in the selected layout is incremented by one. At point 460 counter XR is loaded with the code of the selected layout. The program proceeds from point 460 to point 462 where counter YR is set to zero. Counter YR ranges from 0 to 4 in keeping track of the four parameters that define each layout selection area. At decision point 464 processing begins at the top of a four-pass loop that transfers the layout area parameters from the LDF to the CCLF adjusted by the current area files, CAOF and CACF, as illustrated in FIGS. 11 and 12. The first two passes require a division and the program proceeds to point 468, while the second two passes require a multiplication and the program proceeds to point 466. The program proceeds from points 466 and 468 to point 470 where the CCLF actually receives the parameters from the LDF adjusted by the contents of the CAOF and the CACF. Additionally, at point 470 counters XR and YR are incremented by one, so that in the next loop pass the next set of parameters will enter into the equations of points 466, 468 and 470. The program proceeds from point 470 to decision point 472 where counter YR is examined. If it is less than 4, the iteration of the loop starting at point 464 is to continue, since all four parameters of the selection area being processed have not been adjusted. In this case, the program returns to point 464. However, if counter YR is 4, all four parameters of the selection area being processed have been adjusted, and the program proceeds to point 474. At point 474, counter NA, which keeps track of the number of selection areas that have not been processed, is decremented by one. The program proceeds to point 476 where counter NA is examined. If it is not zero, one or more, additional selection areas need to be processed and the program returns to point 462. If NA is zero, the parameter transfer and adjustment process of the selection areas of the selected layout is completed, and the program proceeds to point 478. At point 478, the current area files, CAOF and CACF, are updated as illustrated in FIGS. 11 and 12, and the program proceeds to point 480 which is represented by FIG. 18.

FIG. 18 illustrates a routine that performs three functions. The first, is to brighten the pixels of the active selection layout area of the selected layout. The second, is to darken the pixels of the other selection areas of the selected layout. The third is to brighten the outline pixels of the other selection areas of the selected layout. In this routine the pixel coordinates (XS, YS) are determined ("1" for bright, or a "0" for dark) and stored in the processor carry bit, Cy, and the Cursor/Char subroutine of FIG. 16B is called to place that bit in the appropriate location in the screen memory 48. The outline of active selection area of a selected basic layout is not visible because each pixel including the boundary is brightened. When a basic character is chosen, all that is left brightened is the character with all other pixels including the boundary being background ("0"). Inactive selection areas of a selected basic layout (those which have yet to become active) have their boundary brightened by direct display of the pixels stored in the basic layout. All pixels within the inactive selection areas are background.

The routine of FIG. 18 proceeds in the following manner. Point 500 initializes counter CF with the address of the CCLF. The program proceeds to point 502 which initializes counter YS, which is also the Y coordinate of the affected pixels, with the content of location CF+1 which holds Yo of the layout selection area that will be brightened or darkened. The program proceeds to point 504 which initializes counter XS, which is also the X coordinate of the affected pixels, with the content of location CF which holds Xo of the layout selection area that will be brightened or darkened. The program proceeds to point 506 where it is assumed that the pixel with coordinates (XS, YS) is to be brightened and the carry bit Cy of the processor is set to "1". At point 508 five tests are performed. First, if CF=CCLF; that is, if the pixel is in the active selection area. Second, if YS=(CF+1); that is if the pixel is part of the upper outline of any selection area. Third, if YS=(CF+1)+M/(CF+3); that is, if the pixel is part of the lower outline of any selection area. Fourth, if XS=(CF); that is if the pixel is part of the left hand outline of any selection area. Finally, if XS=(CF)+N/(CF+2); that is, is the pixel part of right hand outline of any selection area. If any of the equalities of point 508 is true, the program proceeds to point 512. If none of the equalities of point 508 is true, it means that pixel (XS, YS) is to be dark, and the program proceeds to point 510 where the carry bit of the processor is set to "0". The program proceeds to point 512 where the program branches to point 424 of the cursor/character subroutine of FIG. 16B where the memory bit with coordinates (XS, YS) of the matrix of the character being composed on the screen is loaded with the content of the processor carry bit, Cy. The called subroutine returns at point 514 from point 438 of FIG. 16B. At point 514 a test is performed to determine if XS has reached its maximum value, which is the X value at the right hand outline of the area being brightened or darkened. If XS has not reached its limit, its value is incremented at point 516 and the program returns to point 506. If XS has reached its limit, the program branches to point 518 where a test similar to that performed at point 518 is performed to determine if YS has reached its limit. If it has not, the program proceeds to point 520 where its value is incremented by 1. The program returns to point 504 from point 520. If YS has reached its limit at decision point 518, the program proceeds to point 522 where counter CF is incremented by 4 so that the CF has the address in the CCLF of the next selection area to be processed. The program proceeds to decision point 524 where the contents of new location identified in the CF are examined. If the contents are not zero at decision point 524, it means that at least one more area needs to be processed, and the program returns to point 502. If the contents are zero, it means that all areas have been processed, and the program returns to point 204 of FIG. 14.

The reason for brightening the active selection area before darkening the other selection areas is because selection areas are always defined as rectangles regardless of their apparent shape. That is, all selection areas of a layout are defined by orthogonal coordinates, although they may contain other areas inside them. For example, the basic layout in the third row identified by points 92, 94 and 96, in FIG. 6, is defined in the Layout Data File (LDF) as three areas where area 92 covers the entire matrix with areas 94 and 96 overlapping inside. Thus, by brightening area 92 first, it is made certain that the pixels outside areas 94 and 96 will be bright and those inside areas 94 and 96 will be dark. The routine of FIG. 18 sets the pixels to their right state at computer speed and only the resulting display is visible to the operator.

OPERATION

The operation of the system implementing the present invention with reference to FIG. 1 is described as follows. The initial step wherein a basic layout has not been chosen is illustrated as the initialization of the CAOF and CACF at block 202 of FIG. 14. The choice of the first basic layout as illustrated by point 12 is implemented by the depressing of one of the 15 basic layout keys 62 as illustrated in FIG. 3. The active selection area of the chosen basic layout as illustrated at point 14 is predetermined by the order in which the areas within the basic area are stored within the LDF of FIG. 8. The first area of the chosen basic layout is the one in which the flashing asterisk appears which is immediately loaded into the CAOF and CACF upon selection of the basic layout. The indication of an active selection area is illustrated by an asterisk for purposes of illustration. Preferably, the active selection area itself is brightened and the inactive areas which have not been processed are darkened by the routine of FIG. 18 to permit an operator to readily revisualize layout areas which have been processed and which have yet to be processed for each selected basic. The selection of the first basic character at point 16 is implemented by the depressing of a basic character selection key 64 which on one of its eight illustrated basic characters 72 there appears the desired basic character and thereafter depressing the numbered character selection key 66 which has the same number as the number associated with the chosen basic character as illustrated respectively in the identification of the eight faces by the numbers "1-8" in FIG. 4. The selection of a basic character within the active selection area of the selected basic layout causes the automatic processing of the stack of the CCLF as illustrated in FIG. 11 to cause the appropriate parameters pertaining to the origin and coefficients of compression of the second selection area to be transferred to the CACF and the CAOF as illustrated in FIG. 11. The active status of the second selection area is indicated as at point 18. The selection of a second basic layout for inclusion in the second selection area of the selected first basic layout is implemented at point 20. The selection of the second basic layout is accomplished by the depressing of the appropriate basic layout key 62 as described, supra, with regard to the selection of the first basic layout. The nesting of the second basic layout within the second selection area of the selected first basic layout is implemented by the layout nesting routine as described, supra, with regard to FIG. 17. The selection of the second basic layout as illustrated at step 20, causes the display within the second selection area of the first basic layout of the selected second basic layout and the appearance of the flashing asterisk within the active selection area of the selected second basic layout as illustrated at step 22. The selection of the second basic layout causes the parameters of its first selection area to be loaded into the CAOF and CACF and its second selection area parameters to be placed at the top of the CCLF. At step 24 a second basic character is selected for inclusion within the first active area of the second selected basic layout. The selection of the second basic character is implemented by the depressing of the combination of the basic character selection key 64 and character selection key 66 as described, supra, with regard to the selection of the first basic character at point 16. The selection of the second basic character causes the second selection area of the second selected basic layout to be displayed as the active selection area by the appearance of the aforementioned flashing asterisk as illustrated at point 26. The parameters of the second basic layout are transferred from the top of the CCLF to the CAOF and CACF. The selection of a third basic character for inclusion within the second selection area of the second selected basic layout is accomplished at point 28 by the depressing of the appropriate basic character selection key 64 and character selection key 66 in the same manner as described, supra, with regard to the selection of the first and second basic characters. Thereafter, the basic layout is erased from the display area of the CRT 56 as illustrated at point 30. The screen memory 48 as illlustrated in FIG. 7 contains the pixels defining the composite basic character as illustrated at point 30. The pixel values may be used not only for the display on the CRT 56, but also for driving the printer 60 as well as any other display device and transmission to other devices along the bus 43.

While the invention has been described in terms of its preferred embodiment, it should be understood that numerous modifications may be made to the invention without departing from the spirit and scope thereof as defined in the appended claims.

I claim:

1. A system for generating composite characters from a combination of basic characters for display on a display device having a display area comprising:

(a) means for storing basic characters for permitting the selection of any one of the basic characters for display on the display area, each basic character being stored in a matrix of storage locations with each location storing a pixel of information which may be displayed on the display area when said each basic character is displayed;

(b) means for storing a plurality of basic layouts which may be selected for display on the display area, each basic layout having at least two selection areas within the display area, each of the selection areas being selectable for the display of one of the basic layouts or one of the basic characters, the means for storing basic layouts having storage locations for storing parameters which define each selection area of each basic layout, the parameters for each selection area being the coordinates of an origin and a pair of orthogonal compression coefficients;

(c) basic layout selection means for selecting for display any one of the basic layouts on a selection area of the display area, each of the pixels of a selected basic layout being displayed when a basic layout has not been previously displayed and the pixels of a selected basic layout to be displayed within a selection area of a previously selected basic layout being a function of the orthogonal compression coefficients stored in association with the selection area of the previously selected basic layout;

(d) basic character selection means for selecting for display any one of the basic characters within one of the selection areas of the basic layout, the display of stored pixels of the selected basic character to be displayed within a selection area of a basic layout being a function of the orthogonal compression coefficients stored in association with the selection area of the basic layout;

(e) a current character layout file storage means coupled to the means for storing basic layouts for storing the orthogonal compression coefficients of the selection areas of one or more basic layouts in the order in which the selection areas of selected basic layouts are to have displayed therein either a basic character or another basic layout with the exception of the compression coefficients of the selection area which is currently available to have a basic character or another basic layout displayed therein;

(f) a current area compression file storage means coupled to the current character layout file storage means for storing the orthogonal compression coefficients of the currently available selection area, the orthogonal compression coefficients stored in the current area compression file storage means being coupled to the basic character selection means to permit processing by the basic character selection means when a basic character is selected for display in the currently available selection area and being coupled to the basic layout selection means to permit processing by the basic layout selection means when a basic layout is selected for display in the currently available selection area, the selection of either a basic character or a basic layout for display in the currently available selection area causing another pair of orthogonal compression coefficients of another selection area in the current character layout file storage means to be transferred to the current area compression file for storage therein;

(g) a current area origin file storage means coupled to the current character layout file storage means for storing the coordinates of the origin of the currently available selection area, the coordinates of the origin in the current area origin file being coupled to the basic character selection means to permit processing by the basic character selection means when a basic character is selected for display in the currently available selection area and being coupled to the basic layout selection means to permit processing by the basic layout selection means when a basic layout is selected for display in the currently available selection area, the selection of either a basic character or a basic layout for display in the currently available selection area causing the coordinates of the origin of another selection area stored in the current character layout file storage means to be transferred to the current area origin file storage means for storage therein; and (h) a display memory coupled to the basic character selection means and the basic layout selection means for storing the pixels of any selected basic layouts and selected basic characters which are to be displayed on the display area.

2. A system in accordance with claim 1 wherein:

(a) the location and the number of pixels of a basic character generated by the basic character selection means, which are displayed on the display device within a selection area, is a function of the origin coordinates Xo, Yo, X axis orthogonal compression coefficient Xc, Y axis orthogonal compression coefficient Yc, and the dimensions N and M of the matrices for storing basic characters, wherein N is the number of pixels along the X axis of each character matrix and the display memory and M is the number of pixels along the Y axis of each character matrix and the display memory; and further comprising (b) means for determining the value of the pixel to be stored within the selection area having coordinates XS, YS in the display memory from a selected basic character stored within the selected character's storage location at coordinates XC, YC wherein XC is defined by the equation XC=(XS−Xo)Xc and wherein YC is defined by the equation YC=-(YS−Yo)Yc; and (c) means for causing the value of each pixel at coordinates XC, YC in the selected character's storage location to be within the selected area stored in the display memory at coordinates XS, YS.

3. A system in accordance with claim 2 further comprising:

means for causing the currently available selection area to be identified during its display.

4. A system in accordance with claim 3 wherein the identification is caused by displaying the currently available selection area with a brightness different than the other selection areas of a basic layout.

5. A system in accordance with claim 4 wherein the brightening of the currently available selection area is determined as a function of Xo, Yo and Xc, Yc.

6. A system in accordance with claim 5 wherein each pixel of the currently available selection area is bright if any of the following relationships is satisfied (1) the pixel is within the currently available selection area, (2) YS=Yo, (3) YS=Yo+M/Yc, (4) XS=Xo, and (5) XS=Xo+N/Yc and is dark if all of the relationships (1)–(5) are not true.

7. A system in accordance with claim 3 wherein the identification of the currently available selection area is caused by the display of a marker therein.

8. A system in accordance with claim 2 wherein when the basic layout selection means functions to place an ith basic layout within the currently available selection area of the previously selected basic layout, the contents of the current area origin file storage means are sequentially loaded with X axis and Y axis origin coordinates for the processing of the selection areas of a selected ith layout which are equal respectively to the quantity (Xoi/Xc+Xo) and the quantity (Yoi/Yc+Yo) wherein Xoi and Yoi are respectively the origin coordinates of the selection areas within the selected ith layout and the contents of the current area compression file storage means are sequentially loaded with X axis and Y axis orthogonal compression coefficients for the processing of the selection areas of the ith layout which are equal respectively to the quantity (XciXc) and (YciYc) wherein Xci and Yci are respectively the orthogonal compression coefficients of the selection areas within the ith layout.

9. A system for generating composite characters from a combination of basic characters comprising:

(a) a display means having a display area for displaying composite characters which are generated by the display of basic characters within selectable areas of a basic layout:

(b) means for generating a plurality of basic layouts which may be selected for display on the display area, each basic layout containing a plurality of selection areas, the means for generating including a basic layout memory having storage locations for defining each selection area of each basic layout with a pair of orthogonal compression coefficients and the coordinates of an origin which are processed when any basic character or basic layout is selected for display in any selection area;

(c) means for generating a plurality of basic characters which are individually selected for display within each of the basic layouts of the display area for generating a composite character, the means for generating basic characters including a character memory having storage locations for defining each basic character, each selected basic character being compressed by the orthogonal compression coefficients stored in the basic layout memory in association with the selection area within which the basic character is to be displayed;

(d) the means for generating a plurality of basic characters controlling which of the pixels of the stored basic characters is selected displayed on the display means as a function of the stored orthogonal compression coefficients; and (e) the means for generating a plurality of basic layouts controlling the display of a selected basic layout on the display means as a function of the stored orthogonal compression coefficients and origin of the selection area contained in the selected basic layout.

10. A system in accordance with claim 9 wherein:

(a) the means for generating functions to control the location and the number of pixels of a basic character as a function of the origin coordinates Xo, Yo, X axis orthogonal compression coefficient Xc, Y axis orthogonal compression coefficient Yc, and the dimensions N and M of matrices within the character memory for storing basic characters, wherein N is the number of pixels along the X axis of each character matrix and a display memory included within the display means for storing the pixels to be displayed and M is the number of pixels along the Y axis of each character matrix and the display memory; and further comprising (b) means for determining the value of the pixel to be stored within the selection area having coordinates XS, YS in the display memory from a selected basic character stored within the selected character's storage location at coordinates XC, YC wherein XC is defined by the equation XC=(XS−Xo)Xc and wherein YC is defined by the equation YC=−(YS−Yo)Yc; and (c) means for causing the value of each pixel at coordinates XC, YC in the selected character's storage location to be within the selected area stored in the display memory at coordinates XS, YS.

11. A system in accordance with claim 10 further comprising means for causing a currently available selection area to be identified during its display.

12. A system in accordance with claim 11 wherein the identification is caused by displaying the currently available selection area with a brightness different than the other selection areas of a basic layout.

13. A system in accordance with claim 12 wherein the brightening of the currently available selection area is determined by its orthogonal compression coefficients Xc, Yc and the coordinates of an origin with coordinates Xc,Yc.

14. A system in accordance with claim 13 wherein each pixel of the currently available selection area is bright if any of the following relationships is satisfied (1) the pixel is within the currently available selection area, (2) YS=Yo, (3) YS=Yo+M/Yc, (4) XS=Xo, and (5) XS=Xo+N/Xc and is dark if all of the relationships (1)–(5) are not true.

15. A system in accordance with claim 11 wherein the identification of the currently available selection area is caused by the display of a marker therein.

16. A system in accordance with claim 10 further comprising:

(a) a current character layout file storage means coupled to the means for generating a plurality of basic layouts for storing the orthogonal compression coefficients of the selection areas of one or more basic layouts in the order in which the selection areas of selected basic layouts are to have displayed therein either a basic character or another basic layout with the exception of the compression coefficients of the selection area which is currently available to have a basic character or another basic layout displayed therein;

(b) a current area compression file storage means coupled to the current character layout file storage means for storing the orthogonal compression coefficients of the currently available selection area, the orthogonal compression coefficients stored in the current area compression file storage means being coupled to the means for generating a plurality of basic characters to permit processing by the means for generating a plurality of basic characters when a basic character is selected for display in the currently available selection area and being coupled to the means for generating a plurality of layouts to permit processing by the means for generating a plurality of basic layouts when a basic layout is selected for display in the currently available selection area, the selection of either a basic character or a basic layout for display in the currently available selection area causing another pair of orthogonal compression coefficients of another selection area in the current character layout file storage means to be transferred to the current area compression file for storage therein; and (c) a current area origin file storage means coupled to the current character layout file storage means for storing the coordinates of the origin of the currently available selection area, the coordinates of the origin in the current area origin file being coupled to the means for generating a plurality of basic characters to permit processing by the means for generating a plurality of basic characters when a basic character is selected for display in the currently available selection area and being coupled to the means for generating a plurality of basic layouts to permit processing by the means for generating a plurality of basic layouts when a basic layout is selected for display in the currently available selection area, the selection of either a basic character or a basic layout for display in the currently available selection area causing the coordinates of the origin of another selection area stored in the current character layout file storage means to be transferred to the current area origin file storage means for storage therein.

17. A system in accordance with claim 16 wherein when the means for generating basic layouts functions to place an ith basic layout within the currently available selection area of the previously selected basic layout, the contents of the current area origin file storage means are sequentially loaded with X axis and Y axis origin coordinates for the processing of the areas of a selected ith layout which are equal respectively to the quantity (Xoi/Yc+Xo) and the quantity (Yoi/Xc+Yo) wherein Xoi and Yoi are respectively the origin coordinates of the selection areas within the selected ith layout and the contents of the current area compression file storage means are sequentially loaded with X axis and Y axis orthogonal compression coefficients for the processing of the orthogonal compression coefficients for the processing of the selection areas of the ith layout which are equal respectively to the quantity (XciXc) and (YciYc) wherein Xci and Yci are respectively the orthogonal compression coefficients of the selection areas within the ith layout.

18. A system in accordance with claim 9 further comprising:
  (a) a current character layout file storage means coupled to the means for generating a plurality of basic layouts for storing the orthogonal compression coefficients of the selection areas of one or more basic layouts in the order in which the selection areas of selected basic layouts are to have displayed therein either a basic character or another basic layout with the exception of the compression coefficients of the selection area which is currently available to have a basic character or another basic layout displayed therein;
  (b) a current area compression file storage means coupled to the current character layout file storage means for storing the orthogonal compression coefficients of the currently available selection area, the orthogonal compression coefficients stored in the current area compression file storage means being coupled to the means for generating a plurality of basic characters to permit processing by the means for generating a plurality of basic characters when a basic character is selected for display in the currently available selection area and being coupled to the means for generating a plurality of basic layouts to permit processing by the means for generating a plurality of basic layouts when a basic layout is selected for display in the currently available selection area, the selection of either a basic character or a basic layout for display in the currently available selection area causing another pair of orthogonal compression coefficients of another selection area in the current character layout file storage means to be transferred to the current area compression file for storage therein; and
  (c) a current area origin file storage means coupled to the current character layout file storage means for storing the coordinates of the origin of the currently available selection area, the coordinates of the origin in the current area origin file being coupled to the means for generating a plurality of basic characters to permit processing by the means for generating a plurality of basic characters when a basic character is selected for display in the currently available selection area and being coupled to the means for generating a plurality of basic layouts to permit processing by the means for generating a plurality of basic layouts when a basic layout is selected for display in the currently available selection area, the selection of either a basic character or a basic layout for display in the currently available selection area causing the coordinates of the origin of another selection area stored in the current character layout storage means to be transferred to the current area origin file storage means for storage therein.

19. A system in accordance with claim 18 wherein when the means for generating basic layouts functions to place an ith basic layout within the currently available selection area of the previously selected basic layout, the contents of the current area origin file storage means are sequentially loaded with X axis and Y axis origin coordinates for the processing of the areas of a selected ith layout which are equal respectively to the quantity $(Xoi/Xc+Xo)$ and the quantity $(Yoi/Yc+Yo)$ wherein Xoi and Yoi are respectively the origin coordinates of the selection areas within the selected ith layout and the contents of the current area compression file storage means are sequentially loaded with X axis and Y axis orthogonal compression coefficients for the processing of the orthogonal compression coefficients for the processing of the selection areas of the ith layout which are equal respectively to the quantity $(XciXc)$ and $(YciYc)$ wherein Xci and Yci are respectively the orthogonal compression coefficients of the selection areas within the ith layout.

* * * * *